United States Patent
Cok

(10) Patent No.: US 8,773,392 B2
(45) Date of Patent: *Jul. 8, 2014

(54) TRANSPARENT TOUCH-RESPONSIVE CAPACITOR WITH VARIABLE-PATTERN MICRO-WIRES

(75) Inventor: Ronald Steven Cok, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 205 days.

This patent is subject to a terminal disclaimer.

(21) Appl. No.: 13/406,649

(22) Filed: Feb. 28, 2012

(65) Prior Publication Data

US 2013/0222325 A1    Aug. 29, 2013

(51) Int. Cl.
    *G06F 3/041*    (2006.01)
(52) U.S. Cl.
    USPC ............................. 345/174; 178/18.06
(58) Field of Classification Search
    CPC ........... G06F 2203/04102; G06F 2203/04106;
            G06F 2203/04111; G06F 2203/04112;
            G06F 3/044
    USPC ................... 345/173–178; 173/18.01–20.04;
                                                        200/600
    See application file for complete search history.

(56) References Cited

U.S. PATENT DOCUMENTS

| | | | |
|---|---|---|---|
| 3,223,525 A | 12/1965 | Jonker Hendrik | |
| 6,645,444 B2 | 11/2003 | Goldstein | |
| 6,812,637 B2 | 11/2004 | Cok et al. | |
| 7,663,607 B2 | 2/2010 | Hotelling et al. | |
| 2006/0057502 A1 | 3/2006 | Okada et al. | |
| 2009/0219257 A1* | 9/2009 | Frey et al. | 345/173 |
| 2010/0026664 A1 | 2/2010 | Geaghan | |
| 2010/0156840 A1* | 6/2010 | Frey et al. | 345/174 |
| 2011/0007011 A1 | 1/2011 | Mozdzyn | |
| 2011/0099805 A1 | 5/2011 | Lee | |
| 2011/0115717 A1 | 5/2011 | Hable et al. | |
| 2011/0289771 A1 | 12/2011 | Kuriki | |
| 2011/0290631 A1* | 12/2011 | Kuriki | 200/600 |
| 2011/0308846 A1 | 12/2011 | Ichiki | |
| 2012/0194441 A1* | 8/2012 | Frey | 345/173 |
| 2012/0229417 A1* | 9/2012 | Badaye | 345/174 |
| 2013/0050113 A1* | 2/2013 | Brown | 345/173 |
| 2013/0082970 A1* | 4/2013 | Frey et al. | 345/173 |

FOREIGN PATENT DOCUMENTS

EP    2 390 771    5/2011

* cited by examiner

*Primary Examiner* — Alexander Eisen
*Assistant Examiner* — Sanjiv D Patel
(74) *Attorney, Agent, or Firm* — Raymond L. Owens

(57) ABSTRACT

A touch-responsive capacitive apparatus includes a transparent substrate having electrically connected first pad micro-wires and electrically connected first interstitial micro-wires formed in a first micro-wire layer. The first pad micro-wires are electrically connected to the first interstitial wires. Electrically connected second pad micro-wires and electrically connected second interstitial micro-wires are formed in a second micro-wire layer. The second pad micro-wires are electrically connected to the second interstitial wires. The first or second micro-wire layers are supported by the transparent substrate and pairs of first and second pad areas define corresponding touch-responsive capacitors. A first interstitial micro-pattern is dissimilar from a first pad micro-pattern or a second interstitial micro-pattern is dissimilar from a second pad micro-pattern.

26 Claims, 28 Drawing Sheets

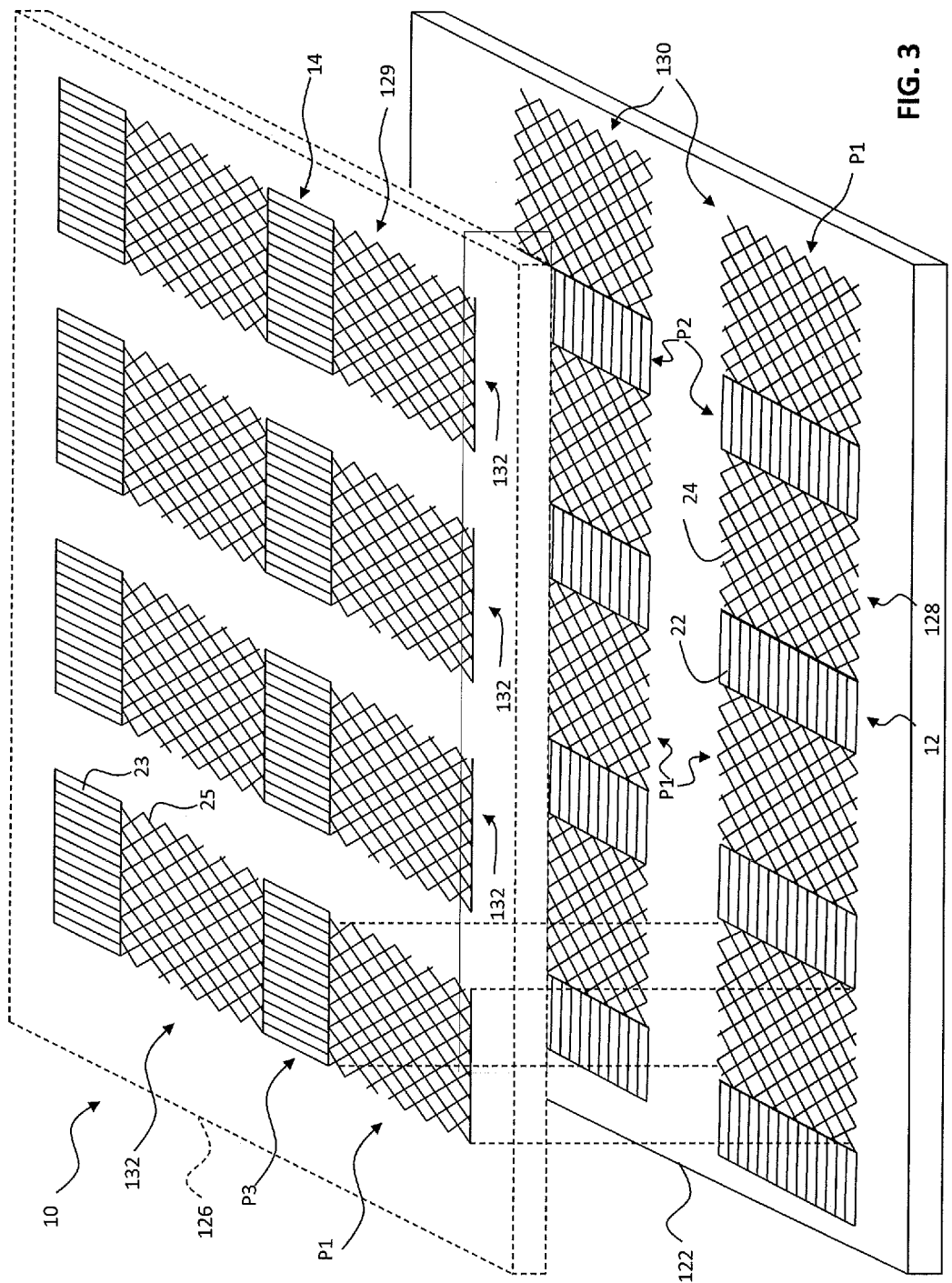

TRANSPARENT TOUCH-RESPONSIVE CAPACITOR WITH VARIABLE-PATTERN MICRO-WIRES

CROSS REFERENCE TO RELATED APPLICATIONS

Reference is made to commonly-assigned, co-pending U.S. patent application Ser. No. 13/406,658 filed concurrently herewith, entitled "TRANSPARENT TOUCH-RESPONSIVE CAPACITOR WITH VARIABLE-HEIGHT MICRO-WIRES" by Ronald S. Cok; U.S. patent application Ser. No. 13/406,665 filed concurrently herewith, entitled "MAKING MICRO-WIRES WITH DIFFERENT HEIGHTS" by Ronald S. Cok, et al.; U.S. patent application Ser. No. 13/406,827 filed concurrently herewith, entitled "PATTERN-WISE DEFINING MICRO-WIRES WITH DIFFERENT HEIGHTS", by Ronald S. Cok; U.S. patent application Ser. No. 13/406,845 filed concurrently herewith, entitled "ELECTRONIC DEVICE HAVING METALLIC MICRO-WIRES", by Ronald S. Cok, et al. and U.S. patent application Ser. No. 13/406,867 filed concurrently herewith, entitled "TOUCH SCREEN WITH DUMMY MICRO-WIRES", by Ronald S. Cok, et al., the disclosures of which are incorporated herein.

FIELD OF THE INVENTION

The present invention relates to transparent conductors and their use in capacitive touch screens.

BACKGROUND OF THE INVENTION

Transparent conductors are widely used in the flat-panel display industry to form electrodes that are used to electrically switch the light-emitting or light-transmitting properties of a display pixel, for example in liquid crystal or organic light-emitting diode displays. Transparent conductive electrodes are also used in touch-screens in conjunction with displays. In such applications, the transparency and conductivity of the transparent electrodes are important attributes. In general, it is desired that transparent conductors have a high transparency (for example, greater than 90% in the visible spectrum) and a high conductivity (for example, less than 10 ohms/square).

Typical prior-art conductive electrode materials include indium tin oxide (ITO) and very thin layers of metal, for example silver or aluminum or metal alloys including silver or aluminum. These materials are coated, for example, by sputtering or vapor deposition, and patterned on display or touch-screen substrates, such as glass. However, the current-carrying capacity of such electrodes is limited, thereby limiting the amount of power that can be supplied to the pixel elements. Moreover, the substrate materials are limited by the electrode material deposition process (e.g. sputtering). Thicker layers of metal oxides or metals increase conductivity but reduce the transparency of the electrodes.

Various methods of improving the conductivity of transparent conductors are taught in the prior art. For example, issued U.S. Pat. No. 6,812,637 entitled "OLED Display with Auxiliary Electrode" by Cok, describes an auxiliary electrode to improve the conductivity of the transparent electrode and enhance the current distribution. Such auxiliary electrodes are typically provided in areas that do not block light emission, e.g., as part of a black-matrix structure.

It is also known in the prior art to form conductive traces using nano-particles including, for example silver. The synthesis of such metallic nano-crystals is known. For example, issued U.S. Pat. No. 6,645,444 entitled "Metal nano-crystals and synthesis thereof" describes a process for forming metal nano-crystals optionally doped or alloyed with other metals. U.S. Patent Application Publication No. 2006/0057502 entitled "Method of forming a conductive wiring pattern by laser irradiation and a conductive wiring pattern" describes fine wirings made by drying a coated metal dispersion colloid into a metal-suspension film on a substrate, pattern-wise irradiating the metal-suspension film with a laser beam to aggregate metal nano-particles into larger conductive grains, removing non-irradiated metal nano-particles, and forming metallic wiring patterns from the conductive grains. However, such wires are not transparent and thus the number and size of the wires limits the substrate transparency as the overall conductivity of the wires increases.

Touch screens with transparent electrodes are widely used with electronic displays, especially for mobile electronic devices. Such devices typically include a touch screen mounted over an electronic display that displays interactive information. Touch screens mounted over a display device are largely transparent so a user can view displayed information through the touch-screen and readily locate a point on the touch-screen to touch and thereby indicate the information relevant to the touch. By physically touching, or nearly touching, the touch screen in a location associated with particular information, a user can indicate an interest, selection, or desired manipulation of the associated particular information. The touch screen detects the touch and then electronically interacts with a processor to indicate the touch and touch location. The processor can then associate the touch and touch location with displayed information to execute a programmed task associated with the information. For example, graphic elements in a computer-driven graphic user interface are selected or manipulated with a touch screen mounted on a display that displays the graphic user interface.

Touch screens use a variety of technologies, including resistive, inductive, capacitive, acoustic, piezoelectric, and optical technologies. Such technologies and their application in combination with displays to provide interactive control of a processor and software program are well known in the art. Capacitive touch-screens are of at least two different types: self-capacitive and mutual capacitive. Self-capacitive touch-screens employ an array of transparent electrodes, each of which in combination with a touching device (e.g. a finger or conductive stylus) forms a temporary capacitor whose capacitance is detected. Mutual-capacitive touch-screens can employ an array of transparent electrode pairs that form capacitors whose capacitance is affected by a conductive touching device. In either case, each capacitor in the array is tested to detect a touch and the physical location of the touch-detecting electrode in the touch-screen corresponds to the location of the touch. For example, U.S. Pat. No. 7,663,607 discloses a multipoint touch-screen having a transparent capacitive sensing medium configured to detect multiple touches or near touches that occur at the same time and at distinct locations in the plane of the touch panel and to produce distinct signals representative of the location of the touches on the plane of the touch panel for each of the multiple touches. The disclosure teaches both self- and mutual-capacitance touch-screens.

Referring to FIG. 10, a prior-art display and touch-screen system 100 includes a display 110 with a corresponding touch screen 120 mounted with the display 110 so that information displayed on the display 110 can be viewed through the touch screen 120. Graphic elements displayed on the display 110 are selected, indicated, or manipulated by touching a corresponding location on the touch screen 120. The touch screen 120 includes a first transparent substrate 122 with first transparent electrodes 130 formed in the x-dimension on the first transparent substrate 122 and a second transparent substrate 126 with second transparent electrodes 132 formed in the y-dimension facing the x-dimension first transparent electrodes 130 on the second transparent substrate 126. A dielectric layer 124 is located between the first and second transparent substrates 122, 126 and first and second transparent electrodes 130, 132. Referring also to the top view of FIG. 11, in this example first pad areas 128 in the first transparent electrodes 130 are located adjacent to second pad areas 129 in the second transparent electrodes 132. (The first and second pad areas 128, 129 are separated into different parallel planes by the dielectric layer 124.) The first and second transparent electrodes 130, 132 have a variable width and extend in orthogonal directions (for example as shown in U.S. Patent Publication Nos. 2011/0289771 and 2011/0099805). When a voltage is applied across the first and second transparent electrodes 130, 132, electric fields are formed between the first pad areas 128 of the x-dimension first transparent electrodes 130 and the second pad areas 129 of the y-dimension second transparent electrodes 132.

A display controller 142 connected through electrical buss connections 136 controls the display 110 in coordination with a touch-screen controller 140. The touch-screen controller 140 is connected through electrical buss connections 136 and wires 134 and controls the touch screen 120. The touch-screen controller 140 detects touches on the touch screen 120 by sequentially electrically energizing and testing the x-dimension first and y-dimension second transparent electrodes 130, 132.

Referring to FIG. 12, in another prior-art embodiment, rectangular first and second transparent electrodes 130, 132 are arranged orthogonally on first and second transparent substrates 122, 126 with intervening dielectric layer 124, forming touch screen 120 which, in combination with the display 110 forms a touch screen and display system 100. First and second pad areas 128, 129 are formed where the first and second transparent electrodes 130, 132 overlap. The touch screen 120 and display 110 are controlled by touch screen and display controllers 140, 142, respectively, through electrical busses 136 and wires 134.

Since touch-screens are largely transparent, any electrically conductive materials located in the transparent portion of the touch-screen either employ transparent conductive materials (for example, transparent conductive metal oxides such as indium tin oxide) or employ conductive elements that are too small to be readily resolved by the eye of a touch-screen user. Transparent conductive metal oxides are well known in the display and touch-screen industry and have a number of disadvantages, including inadequate transparency and conductivity and a tendency to crack under mechanical or environmental stress. Thus, touch-screens including very fine patterns of conductive elements, such as metal wires or conductive traces are useful. For example, U.S. Patent Publication No. 2011/0007011 teaches a capacitive touch screen with a mesh electrode, as does U.S. Patent Publication No. 2010/0026664.

Referring to FIG. 13, a prior-art x- or y-dimension first or second variable-width transparent electrode 130, 132 includes a micro-pattern 156 of micro-wires 150 arranged in a rectangular grid. The micro-wires 150 are multiple very thin metal conductive traces or wires formed on the first and second transparent substrates 122, 126 to form the x- or y-dimension first or second transparent electrodes 130, 132. The micro-wires 150 are so thin that they are not readily visible to a human observer, for example 1 to 10 microns wide. The micro-wires 150 are typically opaque and spaced apart, for example by 50 to 500 microns, so that the first or second transparent electrodes 130, 132 appear to be transparent and the micro-wires 150 are not distinguished by an observer.

U.S. Patent Publication No. 2009/0219257 discloses a touch screen sensor that includes a visible light transparent substrate and an electrically conductive micro-pattern disposed on or in the visible light transparent substrate. The micro-pattern includes a first region micro-pattern with a first sheet resistance value and a second region micro-pattern with a second sheet resistance different from the first sheet resistance value. As disclosed, the second region sheet resistance is lower than the first and includes micro-breaks in the conductive micro-pattern.

Mutually-capacitive touch screens typically include arrays of capacitors whose capacitance is repeatedly tested to detect a touch. In order to detect touches rapidly, highly conductive electrodes are useful. In order to readily view displayed information on a display at a display location through a touch screen, it is useful to have a highly transparent touch screen. There is a need, therefore, for an improved method and apparatus for providing electrodes with increased conductivity and transparency in a mutually capacitive touch-screen device.

SUMMARY OF THE INVENTION

In accordance with the present invention, a touch-responsive capacitive apparatus comprises:

a transparent substrate;

a plurality of electrically connected first pad micro-wires formed in a first pad micro-pattern in first pad areas in a first micro-wire layer and a plurality of electrically connected first interstitial micro-wires formed in a first interstitial micro-pattern in first interstitial areas in the first micro-wire layer, the first pad micro-wires electrically connected to the first interstitial wires;

a plurality of electrically connected second pad micro-wires formed in a second pad micro-pattern in second pad areas in a second micro-wire layer and a plurality of electrically connected second interstitial micro-wires formed in a second interstitial micro-pattern in second interstitial areas in the second micro-wire layer, the second pad micro-wires electrically connected to the second interstitial wires;

wherein the first or second micro-wire layers are supported by the transparent substrate and pairs of first and second pad areas define corresponding touch-responsive capacitors; and wherein the first interstitial micro-pattern is dissimilar from the first pad micro-pattern or the second interstitial micro-pattern is dissimilar from the second pad micro-pattern.

The present invention provides improved conductivity and transparency for transparent micro-wire electrodes in a mutually capacitive touch screen without deleteriously affecting the operation of the apparatus.

These, and other, attributes of the present invention will be better appreciated and understood when considered in conjunction with the following description and the accompanying drawings. It should be understood, however, that the following description, although indicating embodiments of the present invention and numerous specific details thereof, is given by way of illustration and not of limitation. For example, the summary descriptions above are not meant to describe individual separate embodiments whose elements are not interchangeable. Many of the elements described as related to a particular embodiment can be used together with, and interchanged with, elements of other described embodiments. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIG. 3 is an exploded perspective illustrating an embodiment of the present invention;

DETAILED DESCRIPTION OF THE INVENTION

Figure 1A:
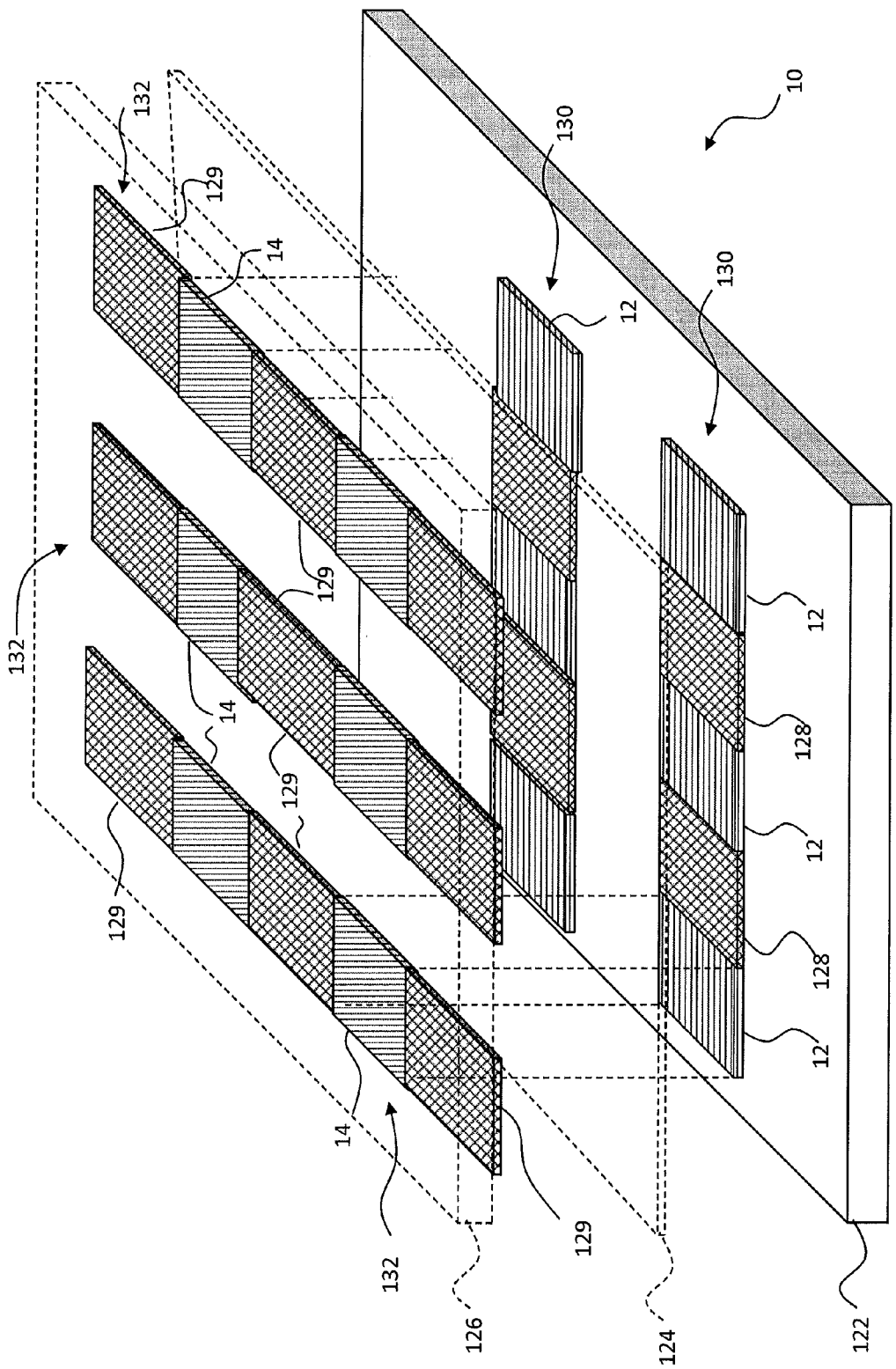
FIG. 1A is an exploded perspective illustrating an embodiment of the present invention.
Figure 1B:
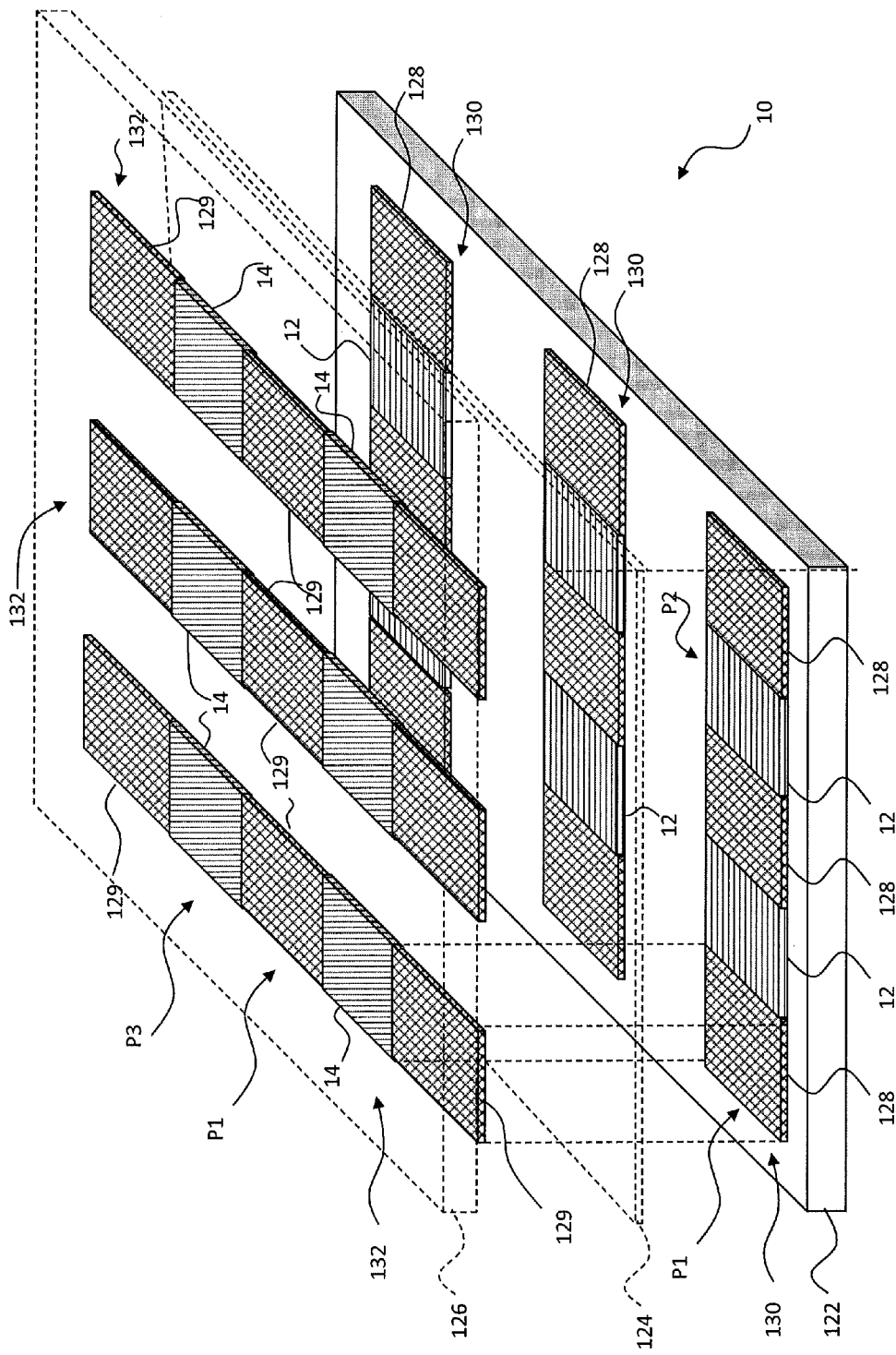
FIG. 1B is an exploded perspective illustrating an embodiment of the present invention.

Referring to FIGS. 1A, 1B, and 3, according to embodiments of the present invention, a touch-responsive capacitive apparatus 10 includes a first transparent substrate 122. A plurality of electrically connected first pad micro-wires 24 are formed in a first pad micro-pattern P1 in first pad areas 128 in a first micro-wire layer and a plurality of electrically connected first interstitial micro-wires 22 are formed in a first interstitial micro-pattern P2 in first interstitial areas 12 in the first micro-wire layer. The first pad micro-wires 24 are electrically connected to the first interstitial wires 22. The first pad micro-wires 24 and the first interstitial wires 22 can define a transparent conductive area forming a first transparent electrode 130 extending in a first direction over the first transparent substrate 122.

Likewise, a plurality of electrically connected second pad micro-wires 25 are formed in a micro-pattern P1 in the second pad areas 129 in a second micro-wire layer on a second transparent substrate 126 and a plurality of electrically connected second interstitial micro-wires 23 are formed in a second interstitial micro-pattern P3 in second interstitial areas 14 in the second micro-wire layer. The second pad micro-wires 25 are electrically connected to the second interstitial wires 23. The second pad micro-wires 25 and the second interstitial wires 23 can define a conductive area forming a second transparent electrode 132 extending in a second direction over the second transparent substrate 126.

The first and second transparent substrate 122, 126 can be similar substrates, for example made of similar materials and having similar material deposited and patterned thereon. Likewise, the first and second transparent electrodes 130, 132 can be similar, for example made of similar materials using similar processes. In particular, the first pad micro-wires 24 formed as part of the first transparent electrode 130 can include the same materials and have the same pattern and structure as second pad micro-wires 25 formed as part of the second transparent electrode 132 and in the same micro-pattern. The first interstitial micro-wires 22 formed as part of the first transparent electrode 130 can include the same materials and structure as second interstitial micro-wires 23 formed as part of the second transparent electrode 132 and in the same micro-pattern. In one embodiment, the first and second pad micro-wires 24, 25 have the same micro-pattern P1 (although in another embodiment they could differ). In another embodiment, the first and second interstitial micro-wires 22, 23 have different micro-patterns P2, P3 (although in another embodiment they could be the same). The first and second directions of the first and second transparent electrodes 130, 132 can be different, for example orthogonal.

The first or second micro-wire layers are supported by the first transparent substrate 122 and pairs of first and second pad areas 128, 129 define corresponding touch-responsive capacitors. The first interstitial micro-pattern P2 is dissimilar from the micro-pattern P1 of first pad area 128 or the second interstitial micro-pattern P3 is dissimilar from the micro-pattern P1 of second pad area 129.

The first or second pad areas 128, 129 and first or second interstitial areas 12, 14 can be formed upon, over, or under one or the other sides of the first transparent substrate 122 or on layers located upon, over, under, or adjacent to one or the other sides of the first transparent substrate 122. As illustrated in the example of FIGS. 1A and 1B, the first pad areas 128 and first interstitial areas 12 are formed on the top side of the first transparent substrate 122 and the second pad areas 129 and second interstitial areas 14 are formed on the bottom side of a second transparent substrate 126 located over and facing the first transparent substrate 122. The first and second transparent substrates 122, 126 are separated by a dielectric layer 124. Alternatively, the first and second micro-wire layers can be formed on opposite sides of a common dielectric layer 124, as discussed further below.

Figure 2A:
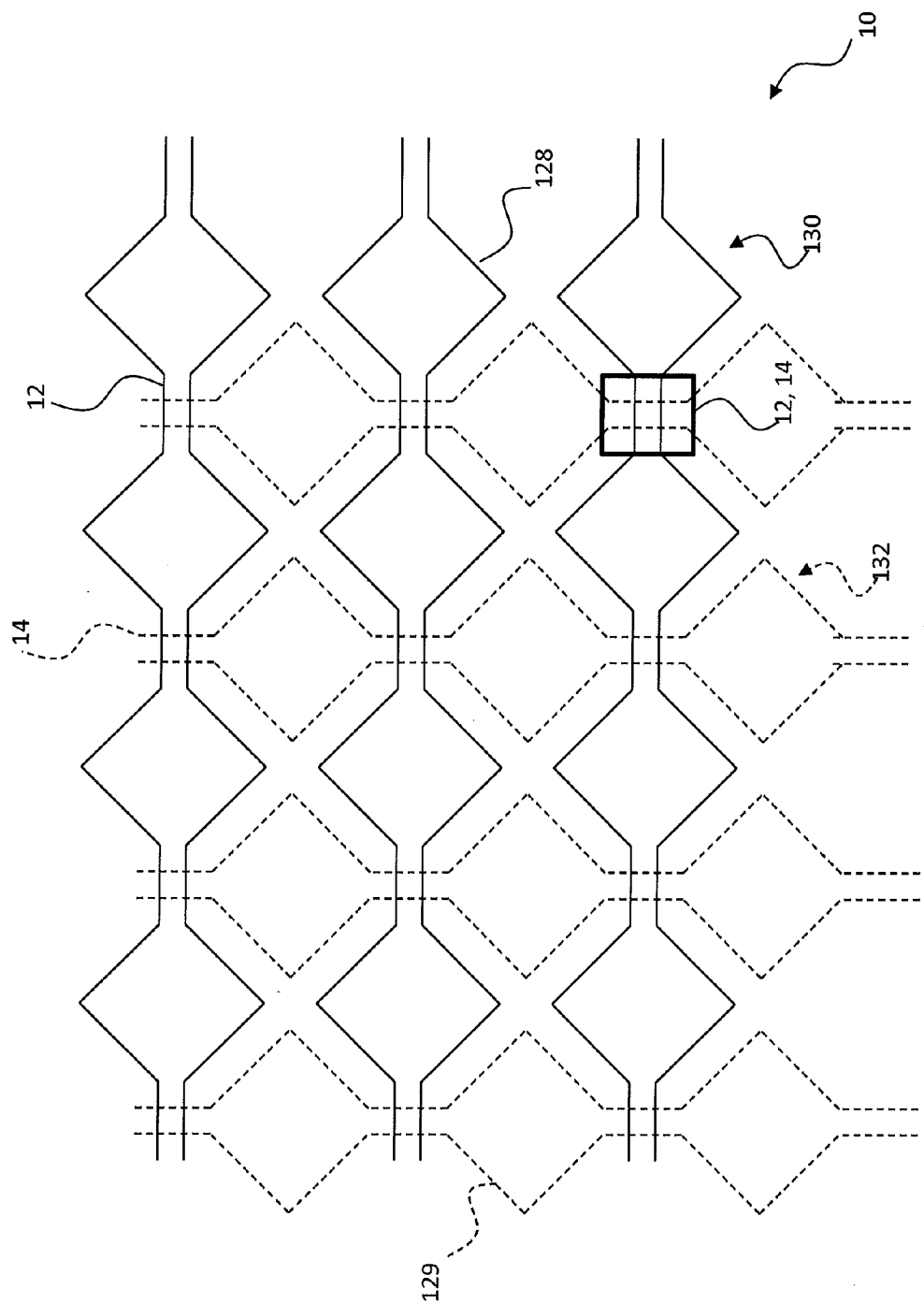
FIG. 2A is a top-view schematic illustrating an embodiment of the present invention.
Figure 2B:
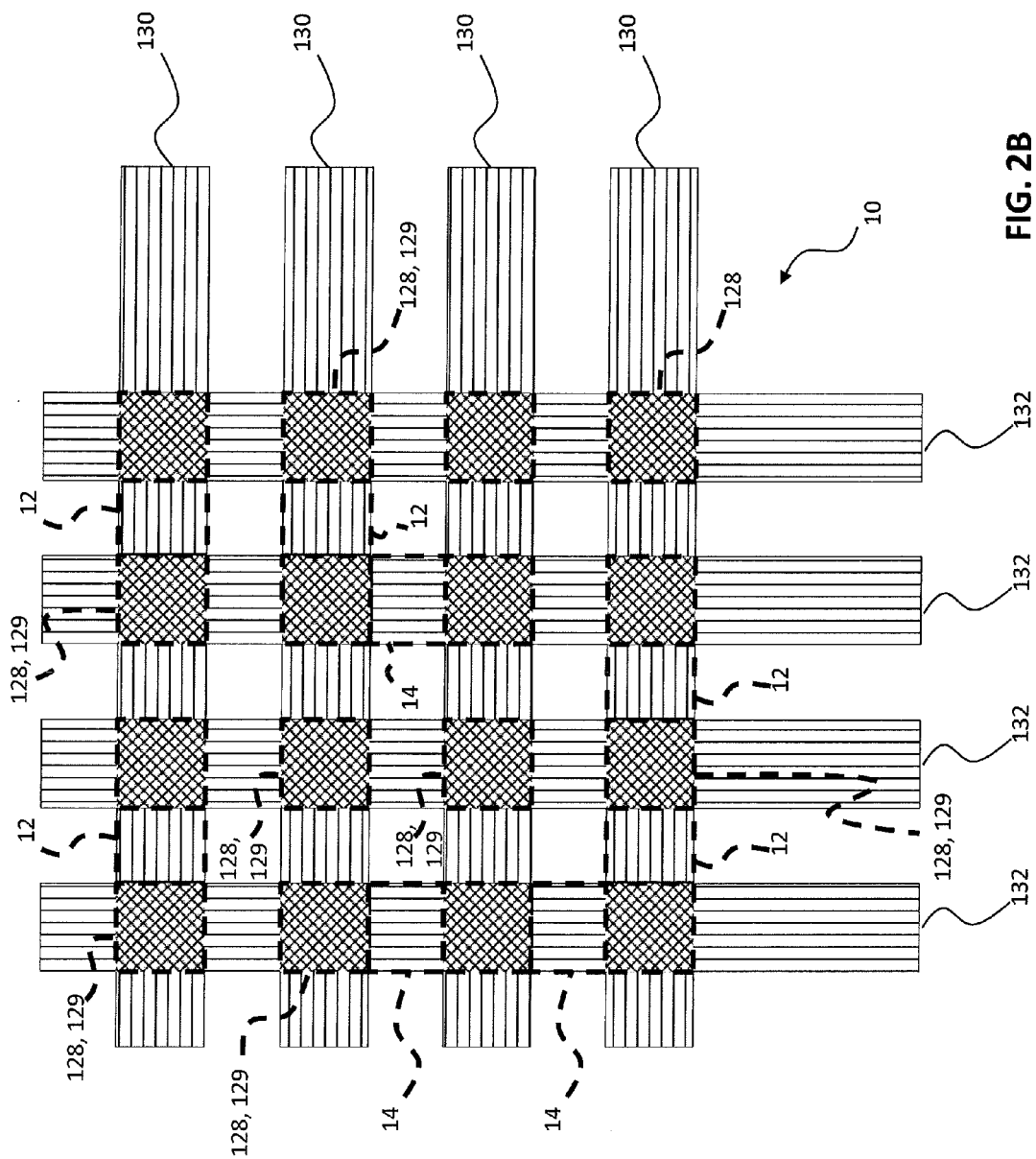
FIG. 2B is a top-view schematic illustrating an embodiment of the present invention.

As shown in FIG. 1A and referring further to the top view of FIG. 2A, in a touch-responsive capacitive apparatus 10, the first pad areas 128 are adjacent to the second pad areas 129 and the first interstitial areas 12 overlap the second interstitial areas 14. As shown in FIG. 1B and referring further to FIG. 2B in an alternative embodiment of a touch-responsive capacitive apparatus 10 of the present invention, the first pad areas 128 overlap the second pad areas 129 and the first interstitial areas 12 are adjacent to the second interstitial areas 14. In FIG. 2A, the first interstitial areas 12 and first pad areas 128 form the variable-width first transparent electrode 130 and the second interstitial areas 14 and second pad areas 129 form the variable-width second transparent electrode 132. In FIG. 2B, the first interstitial areas 12 and first pad areas 128 form the rectangular first transparent electrode 130 and the second interstitial areas 14 and second pad areas 129 form the rectangular second transparent electrode 132.

According to the present invention, the first interstitial micro-pattern P2 is dissimilar from the micro-pattern P1 of first pad area 128 or the second interstitial micro-pattern P3 is dissimilar from the micro-pattern P1 of the second pad area 129. A micro-pattern is made up of micro-wire elements (such as line segments or curve segments). The elements are positioned at angles relative to each other and have relative sizes. Similar micro-patterns have elements positioned at the same relative angles and have the same relative sizes and orientation with respect to the micro-wire area in which the micro-wire elements are located. Dissimilar micro-patterns have elements positioned at different relative angles or have different relative sizes or orientation with respect to the micro-wire area in which the micro-wire elements are located. Similar micro-patterns have the same shape but can differ in scale so that two micro-patterns are similar if one is an enlargement of the other and is oriented in the same way. In contrast, dissimilar micro-patterns have elements that form different shapes so that two micro-patterns are dissimilar if one is not an enlargement of the other or is oriented differently with respect to the micro-wire area in which the micro-wire pattern is formed. If one micro-pattern is a rotation of another micro-pattern, it is dissimilar from the other micro-pattern.

A micro-pattern can include a replicated pattern of micro-elements. The replicated pattern can be, for example, a polygon. Two such replicated micro-element patterns or micro-patterns are similar if corresponding sides taken in the same sequence are proportional and corresponding angles taken in the same sequence are equal in measure. If the replicated patterns of micro-elements (or the micro-patterns themselves) do not have corresponding sides taken in the same sequence that are proportional or do not have corresponding angles taken in the same sequence that are equal in measure, then the replicated patterns of micro-elements or micro-patterns are dissimilar.

Figure 4A:
FIGS. 4A, 4B, and 4C are schematics illustrating micro-patterns useful in understanding the present invention.
Figure 4B:
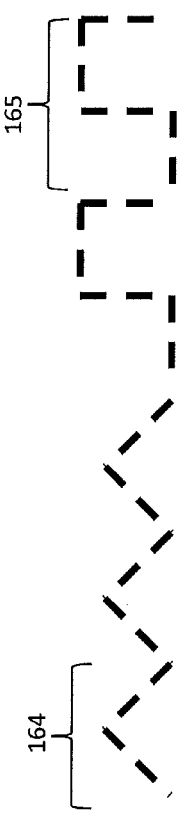
Figure 4C:
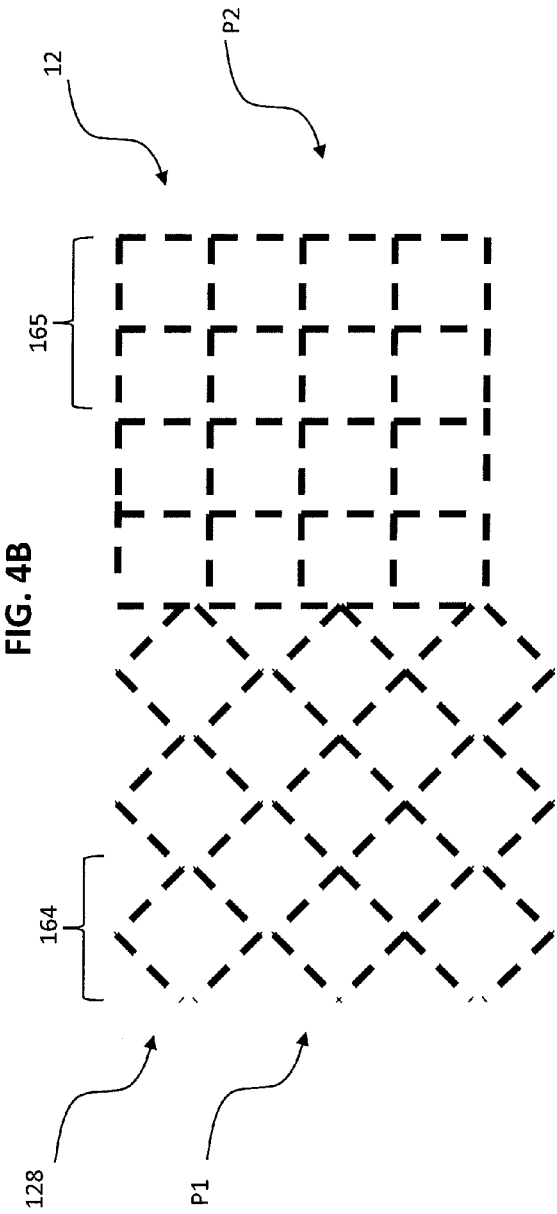

Referring also to the example embodiments of FIGS. 3, 4A, 4B, and 4C, a pad micro-pattern P1 includes pad micro-pattern elements 164 that form a replicated saw-tooth micro-pattern in a first pad area 128. A first interstitial micro-pattern P2 includes micro-pattern elements 162 that form a replicated micro-pattern in a first interstitial area 12. FIG. 3 shows micro-elements and first and second interstitial micro-wires 22, 23 that form straight lines in first and second interstitial areas 12, 14. FIG. 4A shows replicated interstitial micro-pattern elements 162 in a square wave. FIG. 4B shows the pad and interstitial micro-pattern elements 164, 162 replicated in a row and FIG. 4C shows the rows replicated to fill the first pad area 128 and first interstitial area 12.

According to a further embodiment of the present invention, the first pad areas 128 (or second pad area 129) have a different micro-pattern length than the first interstitial areas 12 (or second interstitial areas 14). According to this embodiment of the present invention, a micro-pattern length is the length of the shortest path defined by the micro-pattern across the micro-pattern area divided by the shortest distance across the micro-pattern area. The micro-pattern is typically formed by replicated micro-pattern elements. The replicated micro-pattern elements can be offset with respect to each other in the micro-pattern. By "across the micro-pattern" is meant from one side of an area including the micro-pattern to an opposing side of the area following the micro-pattern path through the replicated elements. For example, the area is the pad area or the interstitial area. Portions of the replicated elements can be employed at the edges of the area.

For the case in which the area forms a polygon with an even number of sides, "from one side of an area . . . to an opposing side" means from one line segment to the opposite line segment. Thus, for the case in which the area is a quadrilateral, "from one side of an area . . . to an opposing side" is meant from one side of the quadrilateral to the opposite side of the quadrilateral; that is to the opposite side that is not adjacent to the one side. The opposite side is generally the side that is encountered by a line extending from the one side through the centroid of the polygon to another side. For the case in which the area is defined by continuous curves, the opposite side is the point encountered by a line extending from the one point through the centroid. The shortest distance is the shortest geodesic distance across the area on the surface on which the micro-pattern is formed. In the embodiment in which the surface on which the micro-pattern is formed is a plane, the shortest geodesic distance is a straight line.

Referring again to FIGS. 4A, 4B, 4C, the areas are rectangular first pad areas 128 and rectangular first interstitial areas 12. In this example, the pad areas have a micro-pattern made up of vertically and horizontally repeated pairs of adjacent angled line segments that form the replicated pad micro-pattern elements 164 forming a saw-tooth or diamond pattern. Each vertically replicated pad micro-pattern element 164 is out of phase by 180 degrees with a vertically adjacent pad micro-pattern element 164, that is each micro-pattern line is offset with respect to the line above or below.

The interstitial areas have a micro-pattern made up of four vertically and horizontally repeated adjacent perpendicular line segments that form the repeated interstitial micro-pattern elements 162 describing a square wave. Four line segments form the replicated interstitial micro-pattern elements 162 and adjacent groups of the replicated micro-pattern elements 162 form the first interstitial micro-pattern P2.

Figure 5:
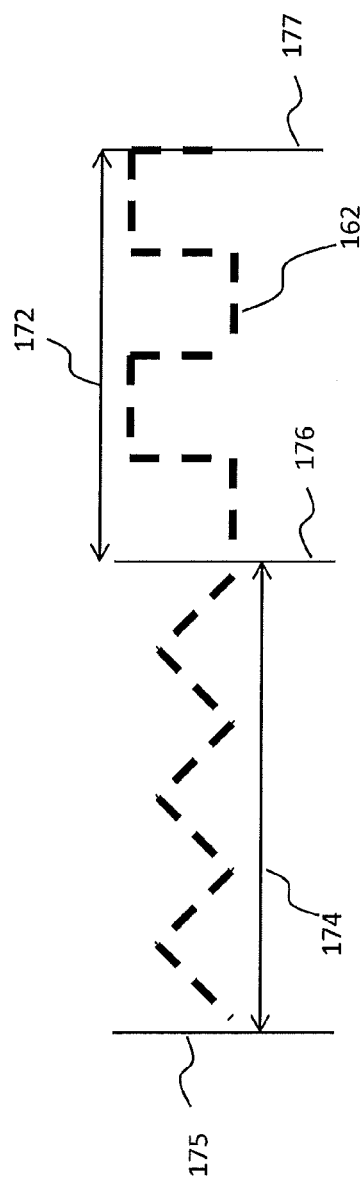
FIG. 5 is a schematic illustrating micro-patterns useful in understanding the present invention.

Referring also to FIG. 5, the pad micro-pattern path length is the distance along the saw-tooth path from one pad micro-pattern side 175 to the other pad micro-pattern side 176. The shortest distance across the pad micro-pattern area is the distance 174. The interstitial micro-pattern path length is the distance along the square-wave path from one interstitial micro-pattern side 176 to the other interstitial micro-pattern side 177. The shortest distance across the interstitial micro-pattern area is the distance 172.

A shortest path across the micro-pattern first pad area 128 defined by the micro-pattern is a saw-tooth path of line segments as illustrated on the left side of FIGS. 4B and C. The shortest distance across the micro-pattern first pad area 128 is a straight line. Presuming that the saw-tooth angles are 90 degrees for the first pad area 128, the micro-pattern length is the path length 2 divided by the shortest distance 1.414 and is equal to 1.414.

A shortest path across the micro-pattern first interstitial area 12 defined by the micro-pattern elements 162 is the four line segments as illustrated on the right side of FIG. 4A-C. The shortest distance across the first micro-pattern pad area 128 is the straight line. Thus, for the first interstitial area 12 the micro-pattern length is the path length 4 divided by the shortest distance 2 and is equal to 2. Therefore the micro-pattern length for the first pad area 128 is different from the micro-pattern length for the first interstitial area 12 (assuming the line segments have equal length).

Note that the micro-pattern length is scale invariant. If the saw-tooth pattern is enlarged, the micro-pattern length stays the same. Likewise, a square wave of a different size has the same micro-pattern length.

Figure 6:
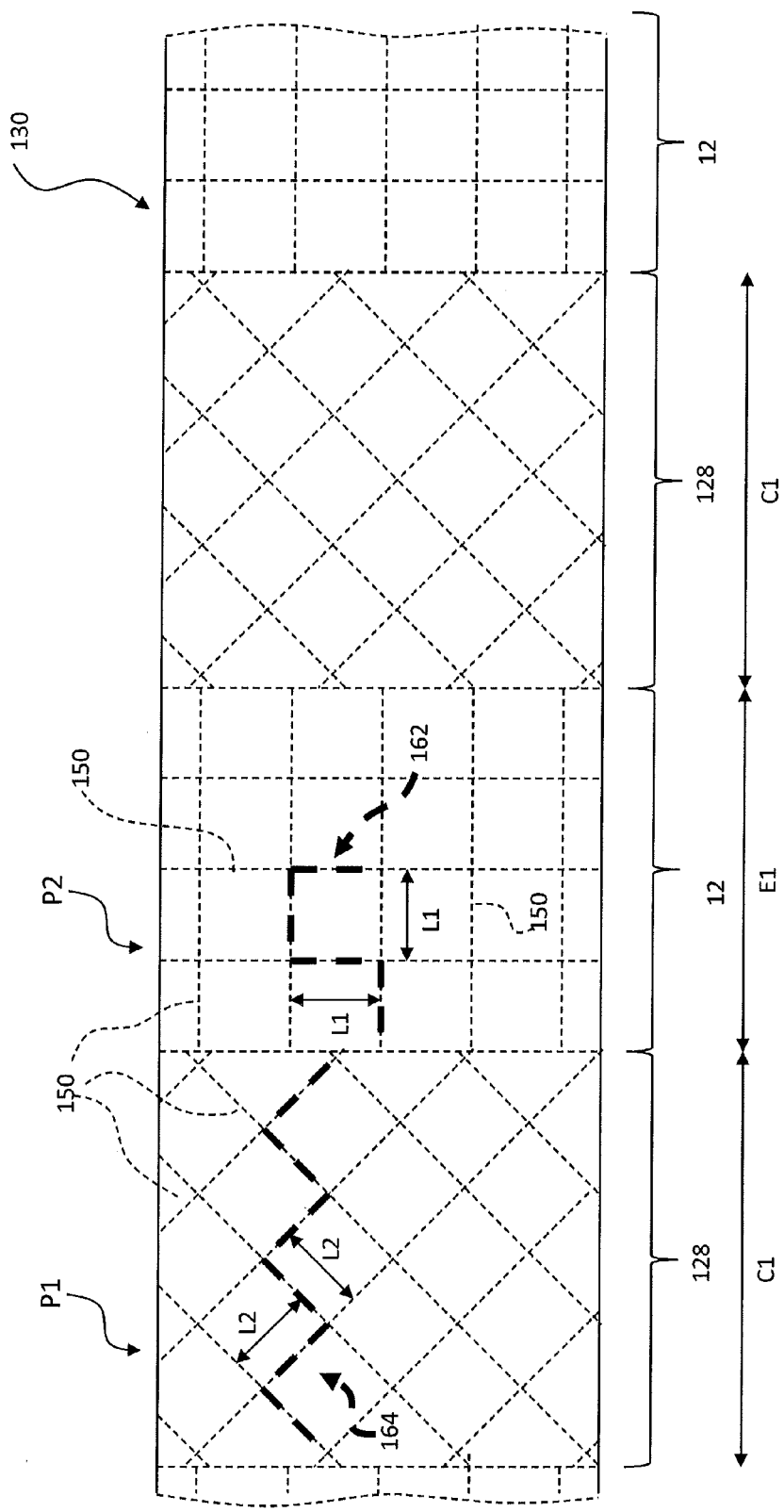
FIG. 6 is a top-view schematic illustrating an embodiment of the present invention.

Referring to FIG. 6, a first transparent electrode 130 according to an embodiment of the present invention includes first pad areas 128 having electrically connected micro-wires 150 forming a pad micro-pattern P1 and first interstitial areas 12 having electrically connected micro-wires 150 forming a first interstitial micro-wire pattern P2. The micro-wires 150 in the first pad areas 128 and the first interstitial areas 12 are electrically connected. In the example of FIG. 6, the saw-tooth pad micro-pattern (P1) is a rotation of the square-wave first interstitial micro-pattern (P2) so the pad micro-pattern P1 is dissimilar from the first interstitial micro-pattern P2 since the pad micro-pattern elements 164 are arranged at different angles relative to the first pad area 128 than the interstitial micro-pattern elements 162 are arranged relative to the first interstitial area 12.

The length of adjacent pad micro-pattern elements 164 in the first pad area 128 is L2 and the length of adjacent interstitial micro-pattern elements 162 in the interstitial area is L1. Therefore, the micro-wire pattern length for the first pad area 128 is (6*L2)/C1 and the interstitial area micro-pattern length is (8*L1)/E1.

Figure 7:
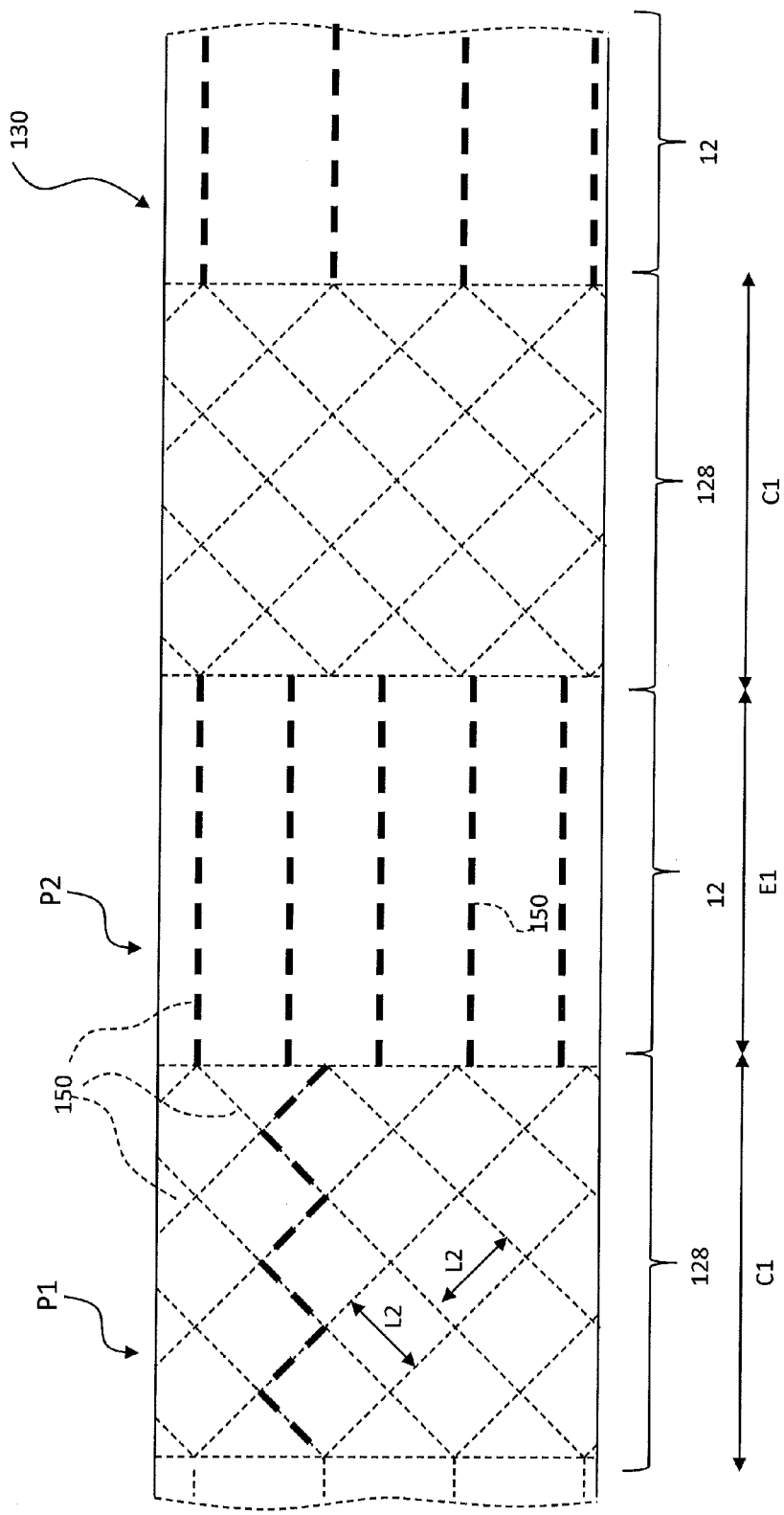
FIG. 7 is a top-view schematic illustrating an embodiment of the present invention.

Referring to FIG. 7, the first transparent electrode 130 includes micro-wires 150 in first pad areas 128 and double-width micro-wires in first interstitial areas 12. The pad area micro-pattern P1 is the same as that for FIG. 6. The first interstitial micro-pattern P2 for the interstitial area is simply a line that runs directly from one side of the first interstitial area 12 to the opposite side. Therefore, the micro-pattern length is 1 and is also different from the micro-pattern length of the first pad area 128.

Note that for FIG. 6, the micro-pattern length is the same in the horizontal dimension as the vertical dimension since the micro-patterns P1 and P2 are orthogonally symmetric. This is not true for the first interstitial area 12 of the example of FIG. 7 where the micro-pattern length in the horizontal dimension is one and is undefined in the vertical dimension, since there is no micro-pattern path from the top to the bottom of the first interstitial area 12.

Figure 8:
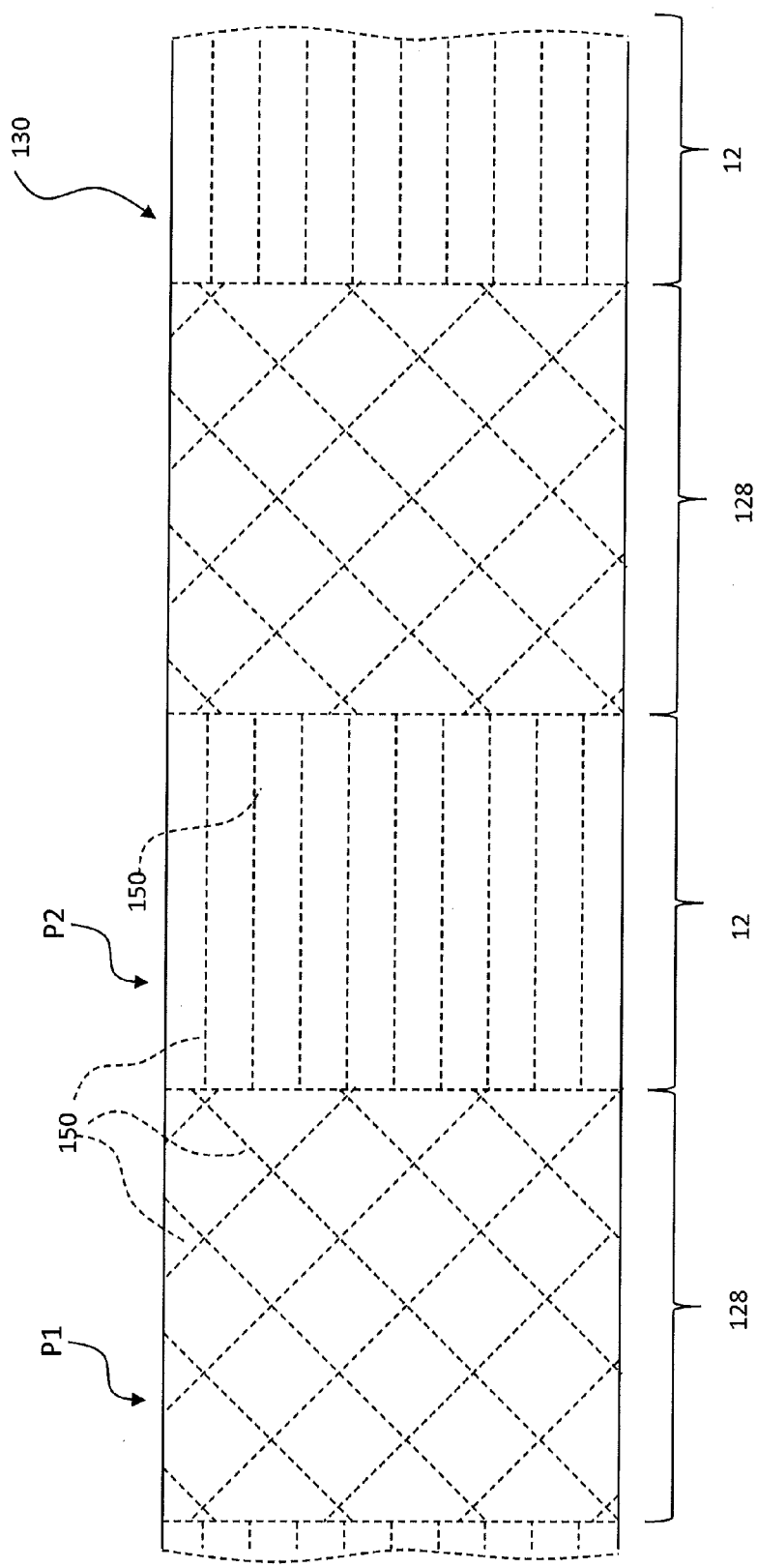
FIG. 8 is a top-view schematic illustrating an embodiment of the present invention.
Figure 9:
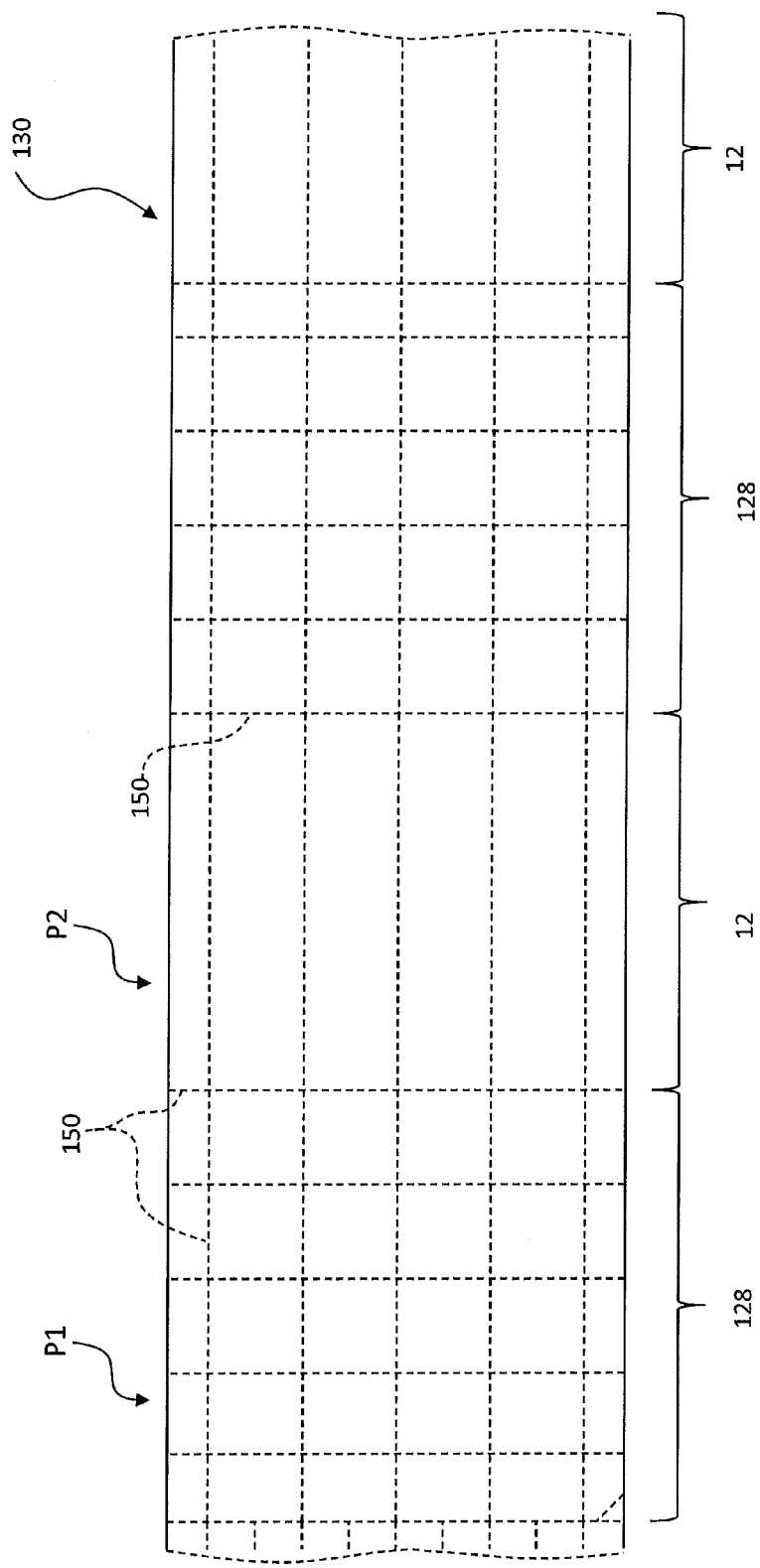
FIG. 9 is a top-view schematic illustrating an embodiment of the present invention.
Figure 10:
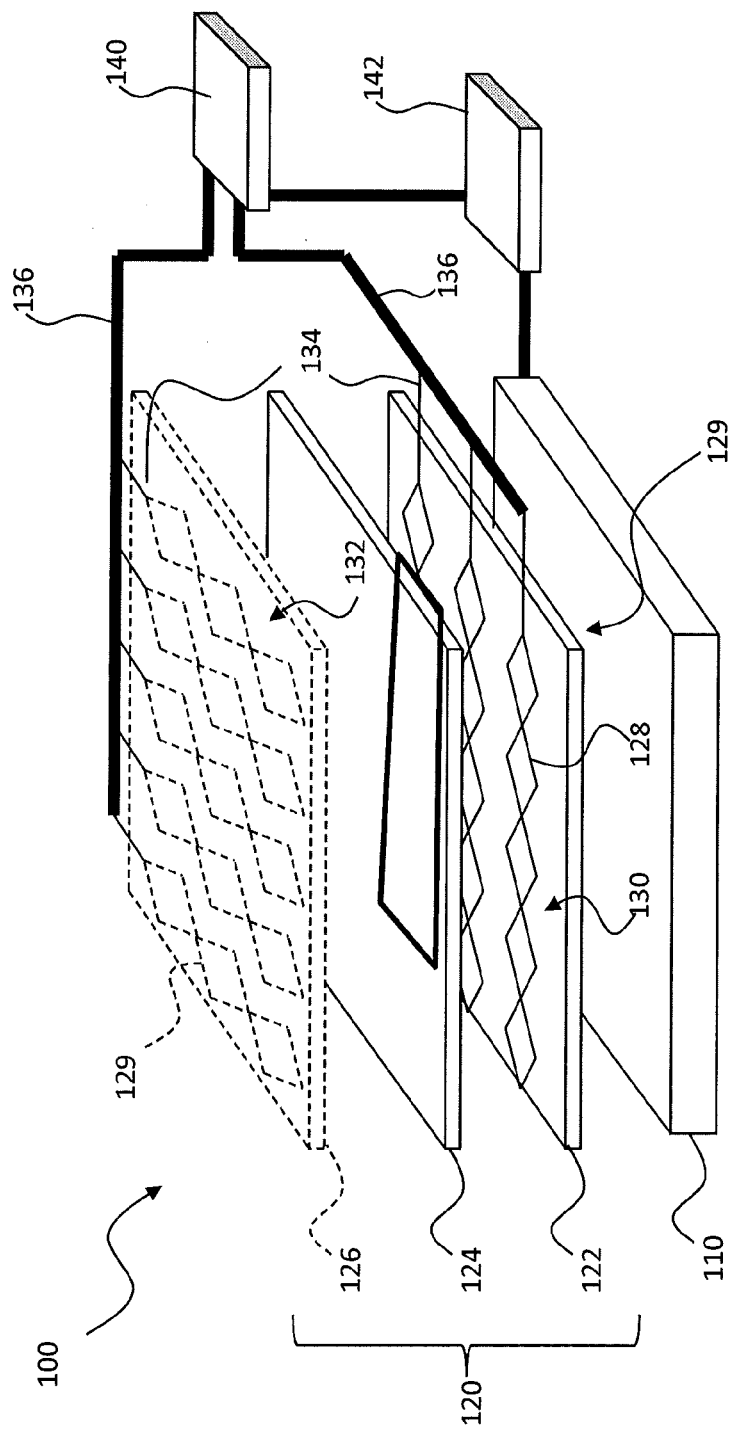
FIG. 10 is an exploded perspective illustrating a prior-art mutual capacitive touch screen having adjacent pad areas in conjunction with a display and controllers.
Figure 11:
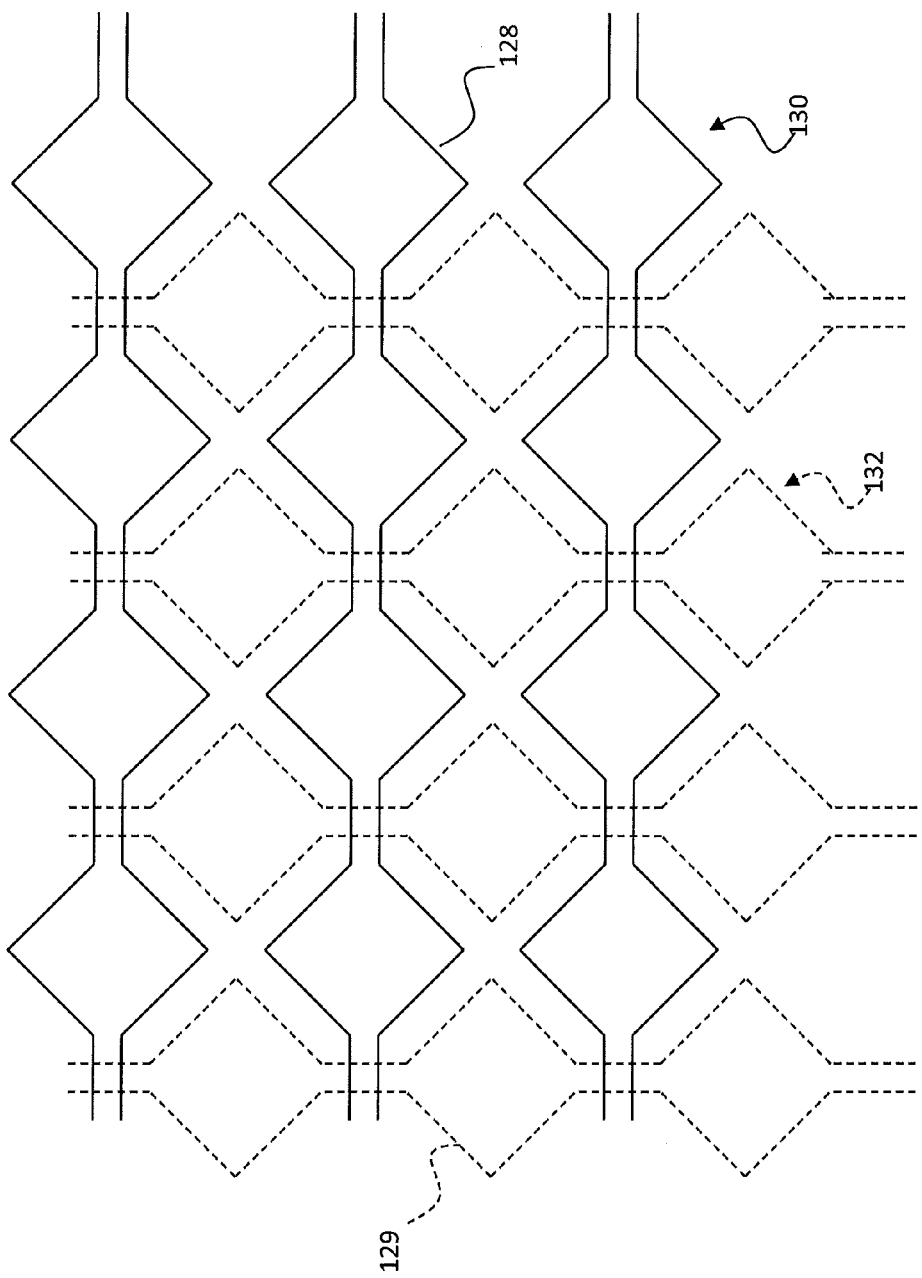
FIG. 11 is a schematic illustrating prior-art pad areas in a capacitive touch screen.
Figure 12:
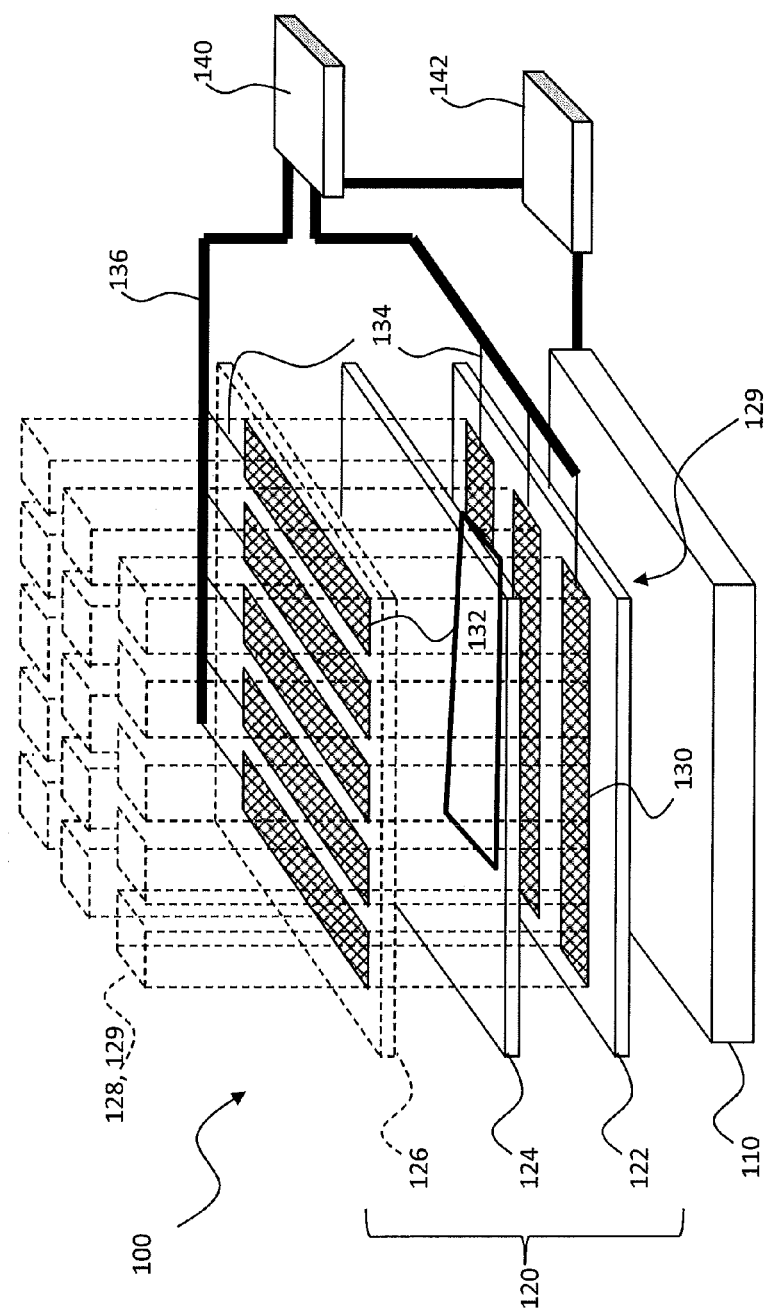
FIG. 12 is an exploded perspective illustrating a prior-art mutual capacitive touch screen having overlapping pad areas in conjunction with a display and controllers.

FIG. 8 is an embodiment of a first transparent electrode 130 that has twice as many horizontal micro-wires 150 in the first interstitial area 12 in first interstitial micro-pattern P2 as are in the first pad area 128 for micro-pattern P1. FIG. 9 illustrates an example of a first transparent electrode 130 with a grid micro-pattern P1 in the first pad area 128 and a horizontal first interstitial micro-pattern P2 having horizontal micro-wires 150 in the first interstitial area 12.

In the examples of FIGS. 6-9, the first transparent electrode 130 illustrated can also be the second transparent electrode 132 having second pad areas 129 and second interstitial areas 14 and correspondingly rotated micro-patterns. Thus, as shown in FIGS. 1A, 1B, 2B, and 3, first transparent electrodes 130 extending in the x dimension are formed on the first transparent substrate 122. Second transparent electrodes 132 extending in the y dimension are formed on the second transparent substrate 126. The second transparent substrate 126 is located above the first transparent substrate 122 and a dielectric layer 124 is located between the first and second transparent substrates 122, 126. The first pad areas 128 and the first interstitial areas 12 are spaced apart and do not overlap but are contiguous. Likewise, the second pad areas 129 and the second interstitial areas 14 are spaced apart and do not overlap but are contiguous. Touch-responsive capacitors are formed by the electric fields resulting from electrical charges placed on the first pad area 128 micro-wires 24 in the first and second pad areas 128, 129 of the first and second transparent electrode 130, 132 separated by dielectric layer 124.

FIGS. 1A and 1B illustrate a first transparent substrate 122 on which the first transparent electrodes 130 are formed and a separate second transparent substrate 126 on which the second transparent electrodes 132 are formed above the first transparent substrate 122. However, other embodiments will suggest themselves to those skilled in the art. In the embodiment illustrated in FIGS. 1A, 1B, 3 and 14A, first transparent electrodes 130 having first pad and first interstitial micro-wires 24, 22 in first pad and first interstitial areas 128, 12 are formed above a first transparent substrate 122 and second transparent electrodes 132 having second pad and second interstitial micro-wires 25, 23 in second pad area 129 and second interstitial areas 14 are formed beneath a separate second transparent substrate 126 located above the first transparent substrate 122 so that the first and second transparent electrodes 130, 132 are separated only by the dielectric layer 124 (not shown in FIGS. 2A, 2B, and 3).

Figure 14A:
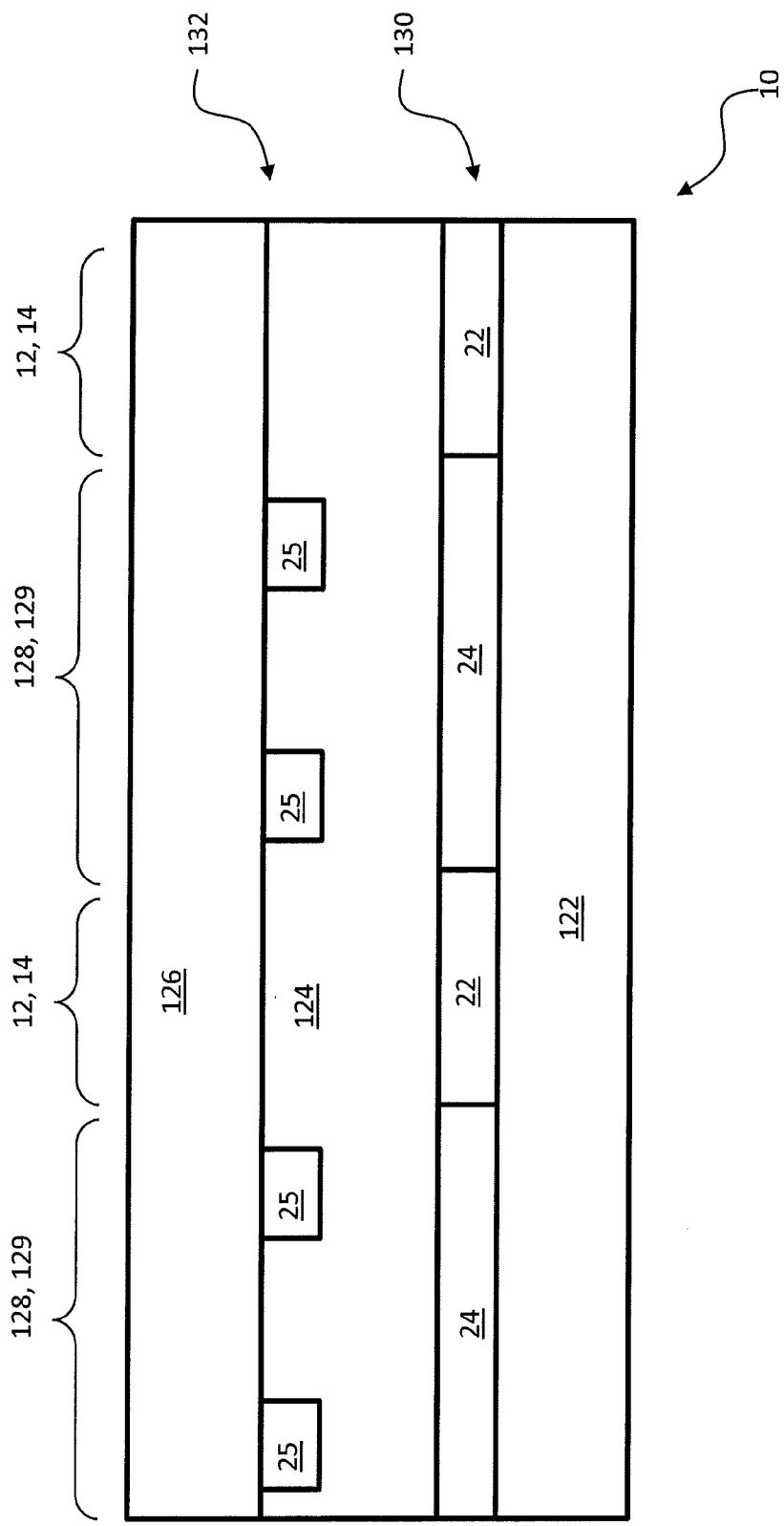
FIGS. 14A and 14B are cross-sections illustrating embodiments of the present invention.
Figure 14B:
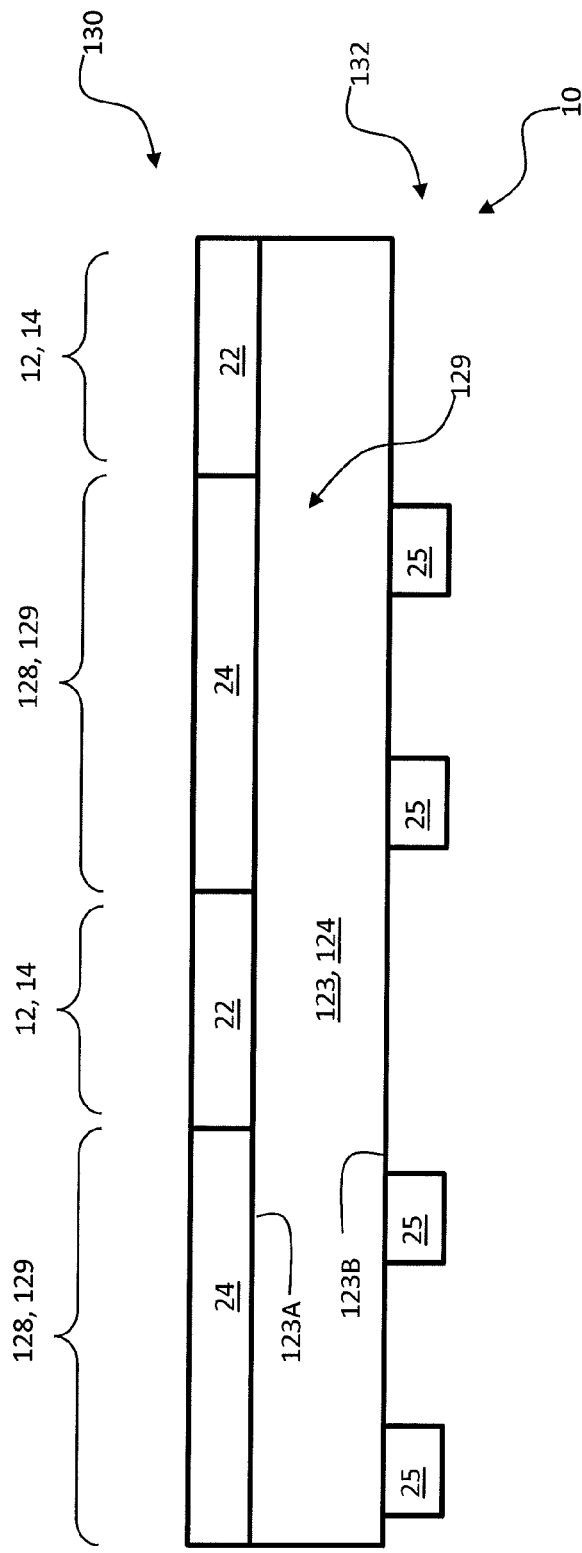

In an alternative embodiment of the present invention illustrated in FIG. 14B, a transparent substrate 123 having first transparent electrodes 130 including first pad and first interstitial micro-wires 24, 22 in first pad and first interstitial areas 128, 12 are located above a first side 123A of the transparent substrate 123 and second transparent electrodes 132 including second pad micro-wires 25 and second interstitial micro-wires 23 (not shown) in second pad area 129 and second interstitial area 14 are located below a second side 123B opposing the first side 123A of the transparent substrate 123 and the transparent substrate 123 is the dielectric layer 124.

The first pad micro-wires 24 in the first and second pad areas 128, 129 form electric fields when energized with a charge.

The first transparent electrodes 130 have two different types of areas, first pad areas 128 and first interstitial areas 12. The first pad areas 128 and the first interstitial areas 12 of the first transparent electrode 130 are formed in a first micro-wire layer. Similarly, the second transparent electrodes 132 have two different types of areas, second pad areas 129 and second interstitial areas 14. The second pad areas 129 and the second interstitial areas 14 of the second transparent electrode 132 are formed in a second micro-wire layer different from the first micro-wire layer in which the first transparent electrode 130 is formed.

Figure 13:
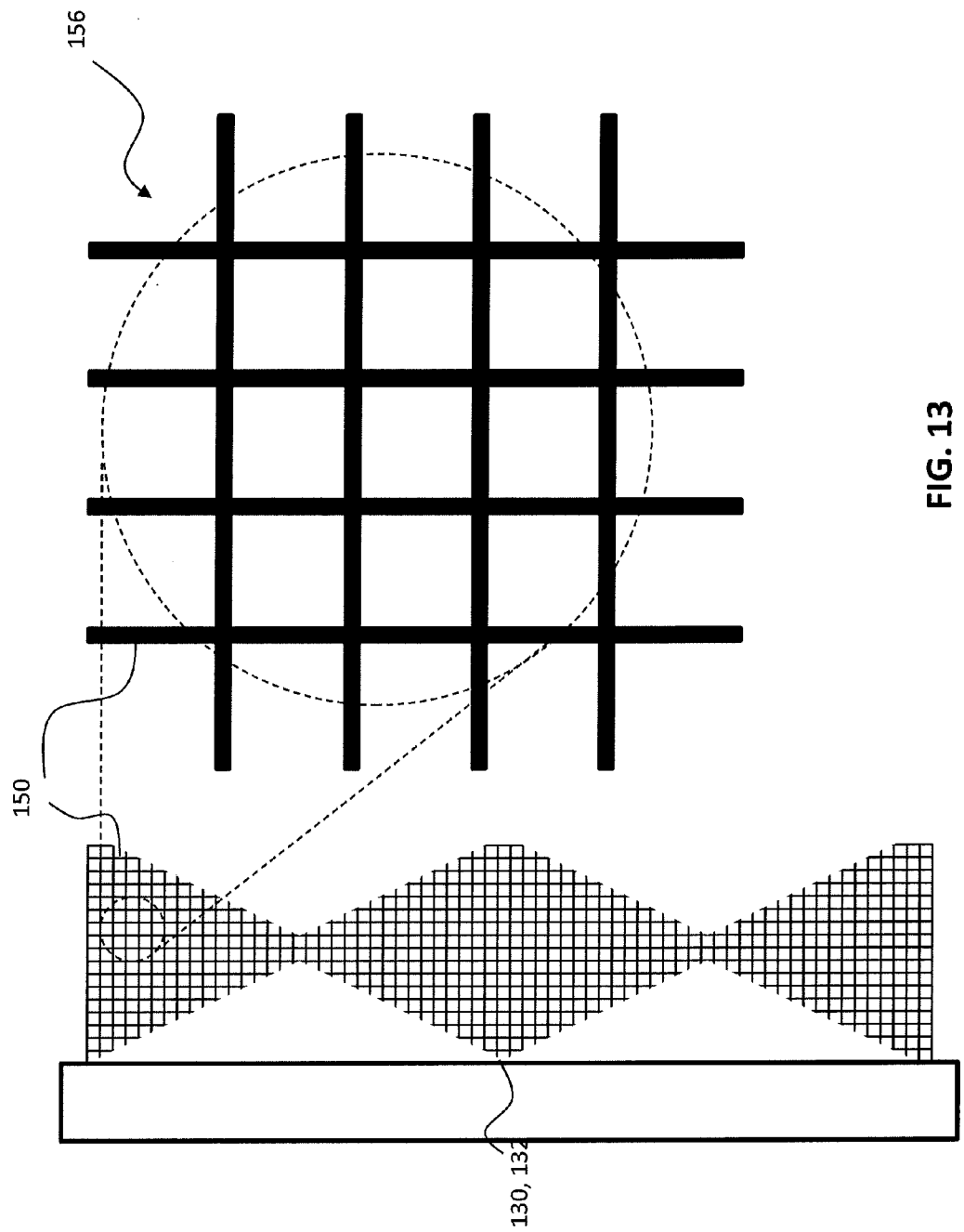
FIG. 13 is a schematic illustrating prior-art micro-wires in an apparently transparent electrode.

The first and second transparent electrodes 130, 132 are made up of micro-wires in both the first and second pad areas 128, 129 and the first and second interstitial areas 12, 14 respectively. Micro-wires are relatively small conductive traces that are not readily resolved by a human eye and are relatively small compared to the first pad areas 128, second pad areas 129, first interstitial areas 12, or second interstitial areas 14. Thus the micro-wires cannot be seen and the majority of the area over the first transparent substrate 122 (or substrates 126 or 123) is transparent and does not include micro-wires, as illustrated in prior art FIG. 13. As shown in prior-art FIG. 13, the majority of the area in the first and second transparent electrodes 130, 132 is open space.

Micro-wires can be metal, for example silver, gold, aluminum, nickel, tungsten, titanium, tin, or copper or various metal alloys including, for example silver, gold, aluminum, nickel, tungsten, titanium, tin, or copper. Alternatively, the first or second micro-wires can include cured or sintered metal particles such as nickel, tungsten, silver, gold, titanium, or tin or alloys such as nickel, tungsten, silver, gold, titanium, or tin. Other materials or methods for forming micro-wires can be employed and are included in the present invention.

As used herein, micro-wires in each electrode are micro-wires formed in a micro-wire layer that forms a conductive mesh of electrically connected micro-wires. Thus, the first pad micro-wires 24 in the first pad areas 128 are in the same micro-wire layer as the first interstitial micro-wires 22 in the first interstitial areas 12. Similarly, the second pad micro-wires 25 in the second pad areas 129 are in the same micro-wire layer as the second interstitial micro-wires 23 in the second interstitial areas 14. A micro-wire layer is a layer in which there is no intervening layer between the pad areas in the micro-wire layer and the interstitial areas in the same micro-wire layer. Thus, the first pad micro-wires 24 in the first pad areas 128 of the first transparent electrode 130 are in a first micro-wire layer with the first interstitial micro-wires 22 in the interstitial areas 12 of the first transparent electrode 130. Similarly, the second pad micro-wires 25 in the second pad areas 129 of the second transparent electrode 132 are in a second different micro-wire layer with the second interstitial micro-wires 23 in the second interstitial areas 14 of the second transparent electrode 132.

In particular, a micro-wire that passes over another micro-wire is no longer in the same micro-wire layer as the other micro-wire. Also, a micro-wire that is electrically connected to another micro-wire through a via is no longer in the same micro-wire layer as the other micro-wire. If a transparent substrate is planar, for example, a rigid planar substrate such as a glass substrate, the micro-wires in a micro-wire layer are formed in, or on, a common plane as a conductive, electrically connected mesh. If a transparent substrate is flexible and curved, for example a plastic substrate, the micro-wires in a micro-wire layer are a conductive, electrically connected mesh that is a common distance from a surface of the flexible, transparent substrate.

The micro-wires can be formed on a transparent substrate or on a layer above (or beneath) the transparent substrate. The micro-wires for each of the first and second transparent electrodes 130, 132 can be formed on opposing sides of the same transparent substrate (e.g. as shown in FIG. 14B) or on facing sides of separate transparent substrates (e.g. as shown in FIG. 14A).

The first pad micro-wires 24 in the first pad areas 128 or the first interstitial micro-wires 22 in the first interstitial areas 12 of a first transparent electrode 130 are electrically interconnected within the first pad areas 128 and within the first interstitial areas 12. Likewise, the second pad micro-wires 25 in the second pad areas 129 or the second interstitial micro-wires 23 in the second interstitial areas 14 of a second transparent electrode 132 are electrically interconnected within the second pad areas 129 and within the second interstitial areas 14. The first interstitial and first pad micro-wires 22, 24 of the first transparent electrode 130 are not electrically connected to the second interstitial and second pad micro-wires 23, 25 of the second transparent electrode 132, as such an electrical connection would cause an electrical short across the touch-responsive capacitors.

According to the present invention, the micro-pattern path length in an interstitial area can be different from or less than the micro-pattern path in a pad area. Furthermore, in some patterns, there is a more direct path from one side of the micro-pattern area to the other than is found using the replicated micro-pattern elements. For example, the first interstitial micro-pattern P2 of FIG. 6 forms a horizontal path across the first interstitial area 12. Such a path does not exist for the pad area micro-pattern P1. Hence, the different micro-pattern path in the interstitial area reduces the resistance of a first transparent electrode 130. Since there exists shorter paths from one side of the first interstitial area 12 to the other side than exist for the first pad areas 128, the resistance of the micro-wires across first interstitial area 12 is reduced compared to the resistance of the micro-wires across first pad area 128.

Since, in a capacitor array formed by overlapping or adjacent orthogonal first and second transparent electrodes (e.g. 130, 132) each capacitor is electrically tested to determine its capacitance and to detect a touch, the RC time constant of the circuit formed by each pair of electrodes limits the rate at which the capacitors can be tested. The RC time constant can be reduced by increasing the conductivity and reducing the resistance (R) of the electrodes. By increasing electrode conductivity and therefore the rate at which the capacitors are tested, faster performance and better user response is provided. Alternatively or in addition, an increase in the number of capacitors is enabled, providing increased resolution in a capacitor array. In another embodiment, fewer micro-wires are used, increasing the transparent electrode transparency. Hence, the present invention can provide improved and faster performance, increased resolution of touch-screen capacitor arrays, or improved electrode transparency.

According to various embodiments of the present invention, a variety of different micro-patterns 156 are employed that can affect the micro-wire resistance across an area, the transparency of the area, and the optical uniformity of the electrode, including the area. Referring to FIG. 6, if L2 is taken to be the same as L1 and the micro-wires 150 in both micro-patterns are either parallel or perpendicular to each other, the diamond shapes of first pad micro-pattern P1 are the same size as the square shapes of first interstitial micro-pattern P2. Since the micro-wires 150 are not individually perceptible, the optical appearance and transparency of the first pad and interstitial areas 128, 12 are similar. However, in this embodiment, the resistance is not reduced because the number of saw-tooth paths across the first pad area 128 is greater than the number of straight paths across the first interstitial area 12. Assuming a unit size of each micro-wire element, the shortest micro-wire path distance across the first pad area 128 is 1.414 times the shortest micro-wire path distance across the first interstitial area 12 but the number of such paths is 1/1.414 times as many, so the actual resistance across the area is the same (assuming identical micro-wires).

Turning to FIG. 7, in contrast, only horizontal micro-wires are included in a transparent electrode according to an embodiment of the present invention. In the example of FIG. 7, the first transparent electrode 130 extends in a horizontal direction and the vertical micro-wires in the interstitial areas 12 of FIG. 6 do not contribute to the conductivity of the first transparent electrode 130. Hence, as shown by the bold dashed lines representing the micro-wires 150 in the first interstitial micro-pattern P2 of the first interstitial area 12, the horizontal micro-wires are twice as wide, doubling the conductivity of the micro-wires 150 in the horizontal direction at the expense of conductivity in the vertical direction. The resistance across the first interstitial area 12 is thus one half that of the first pad area 128. If a vertical electrode is intended (e.g. such as second transparent electrode 132 in FIG. 3), the micro-wires 150 can be oriented in a vertical direction. Referring to FIG. 8 in yet another embodiment, as in the embodiment of FIG. 7, the first transparent electrode 130 extends in a horizontal direction and the vertical micro-wires are used as separate horizontal micro-wires 150 in the first interstitial micro-pattern P2 of the first interstitial area 12. The horizontal micro-wires of FIG. 7 are more difficult to resolve than the horizontal micro-wires of FIG. 6, as they are half as wide. Since twice as many horizontal micro-wires are present in this example, the conductivity of the micro-wires 150 in the horizontal direction is doubled and the resistance across the first interstitial area 12 is one half that of the first pad area 128. In the examples of FIGS. 7 and 8, the overall transparency of the first interstitial area 12 is unchanged, since the number and length of micro-wires 150 in the interstitial areas 12 does not change.

As shown in FIG. 9, first transparent electrode 130 includes a first pad area 128 with a grid micro-pattern P1 of micro-wires 150 and a first interstitial area 12 with horizontal micro-wires 150 in a micro-wire micro-pattern P2. In this embodiment, the conductivity of the first interstitial area 12 is the same as the second pad area 129 (not shown), since the same number of horizontal micro-wires 150 are present. The transparency of the first interstitial area 12, however, is greater than the transparency of the first pad area 128, since first interstitial area 12 has one half of the micro-wires of first pad area 128.

Thus, in various embodiments of the present invention, the conductivity of a transparent electrode over a substrate is reduced or the transparency of the transparent electrode over the substrate is increased. The improved conductivity of the transparent electrode can result in a faster response, lower-power operation, or increased resolution. The improved transparency of the transparent electrode can result in a better appearance of the transparent electrode.

In an embodiment of the present invention, the width of the interstitial micro-wires 150 in the first interstitial area 12 is the same as the width of the first pad micro-wires 24 in the first pad area 128. In another embodiment (e.g. as shown in FIG. 7) the width of the interstitial micro-wires 150 in the first interstitial area 12 is different from the width of the first pad micro-wires 24 in the first pad area 128.

Figure 24A:
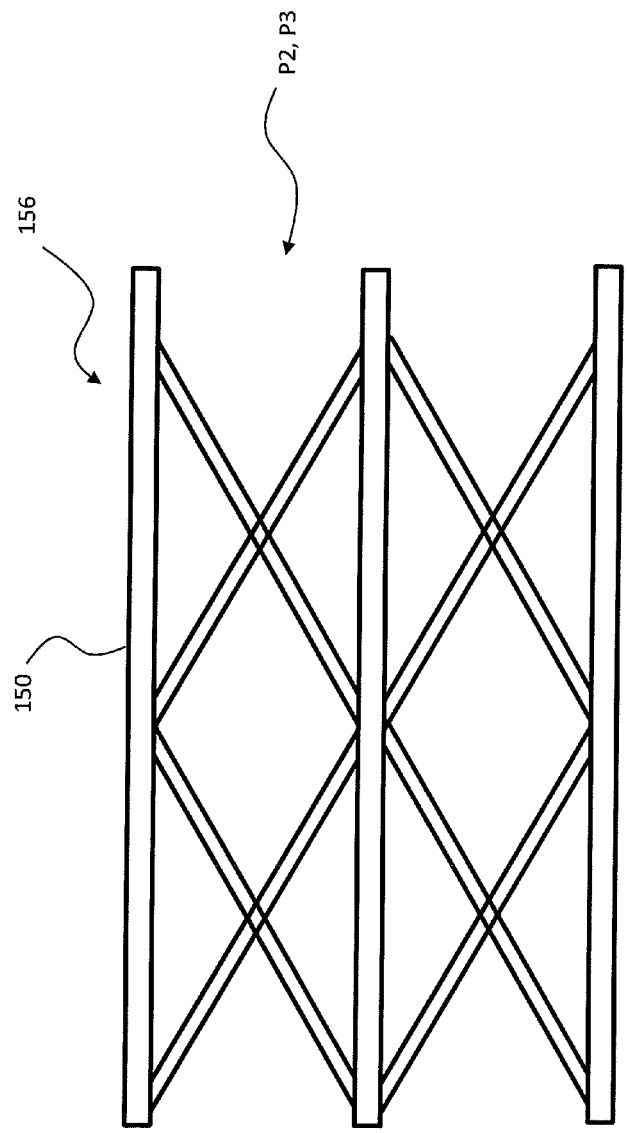
FIG. 24A is a top view of a micro-wire pattern useful in an embodiment of the present invention.
Figure 24B:
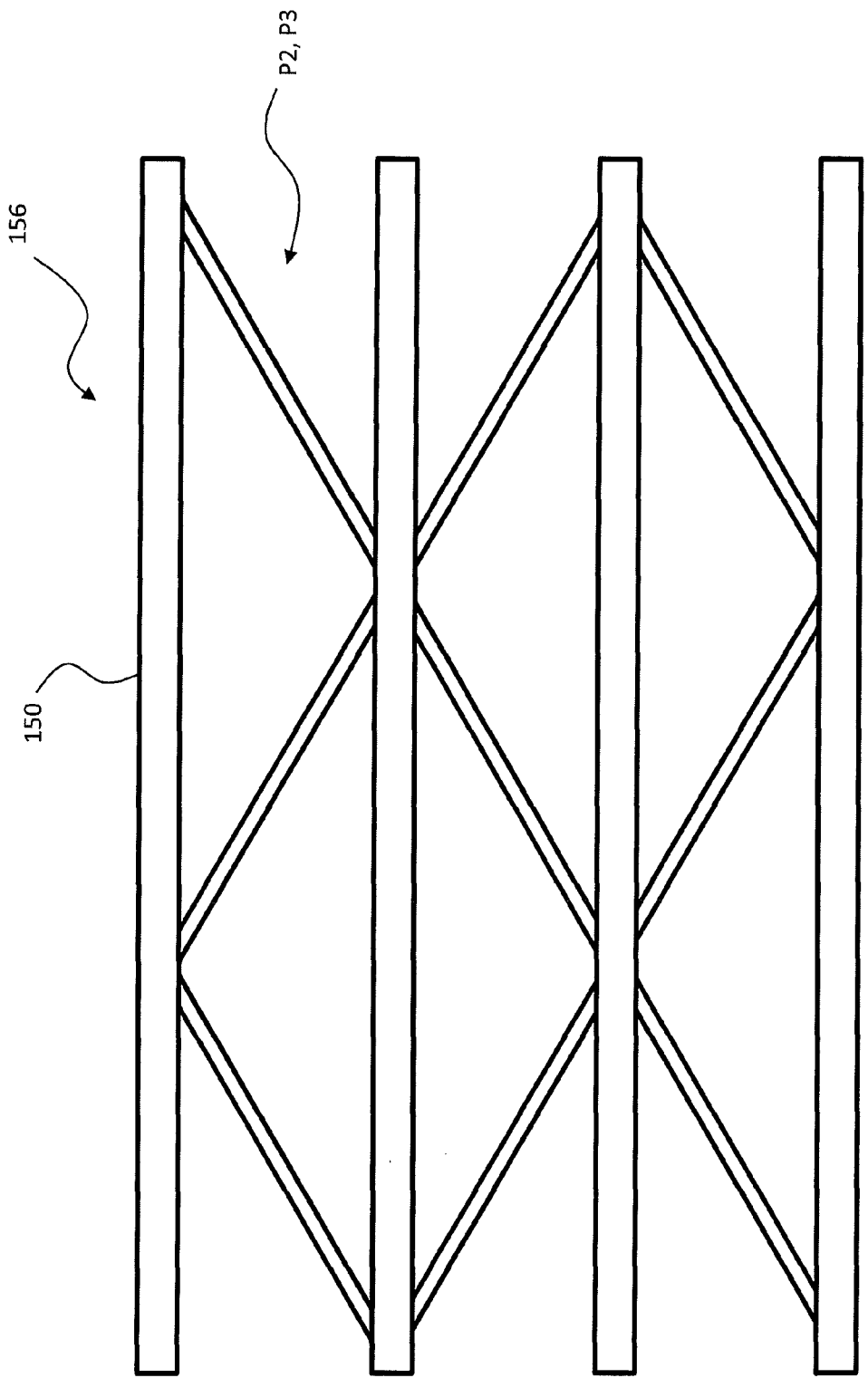
FIG. 24B is a top view of another micro-wire pattern useful in an embodiment of the present invention.

The embodiments of FIGS. 24A and 24B also illustrate micro-patterns 156 including micro-wires 150 that have different widths. In a further embodiment, the width of at least some of the first interstitial micro-wires is greater than the width of the first pad micro-wires and the width of at least some of the first interstitial micro-wires is less than the width of the first pad micro-wires. In these examples, the micro-pattern 156 includes both angled elements and straight line elements that can provide both improved conductivity across an area, robustness to line breaks, and an optical appearance more closely matched to diamond or saw-tooth micro-patterns. The micro-pattern 156 of these examples can be usefully applied to the first or second interstitial micro-patterns P2 or P3 in first or second interstitial areas 12 or 14.

In an embodiment, each first interstitial area 12 electrically connects one or more first pad areas 128. In another embodiment, the first interstitial areas 12 are interspersed between first pad areas 128 so that each first transparent electrode 130 includes alternating first pad areas 128 separated by alternating first interstitial areas 12 (except at the ends of the first transparent electrodes 130). Likewise, the second interstitial areas 14 are interspersed between second pad areas 129 so that each second transparent electrode 132 includes alternating second pad areas 129 separated by alternating second interstitial areas 14 (except at the ends of the second transparent electrode 132). The first and second transparent electrodes 130, 132 can be orthogonal or extend in different first and second directions over a transparent substrate. In the embodiment of FIG. 2A, gaps between the first transparent electrodes 130 form locations for the second pad areas 129 in the second transparent electrode 132 while the gaps between the second transparent electrodes 132 can form locations for the first pad areas 128 in the first transparent electrodes 130. In the embodiment of FIG. 2B, gaps between the first transparent electrodes 130 form locations for the second interstitial areas 14 in the second transparent electrode 132 while the gaps between the second transparent electrodes 132 can form locations for the first interstitial areas 12 in the first transparent electrodes 130.

In an example and non-limiting embodiment of the present invention, each micro-wire 150 (e.g. micro-wires 22, 23, 24, 25) is 5 microns wide and separated from neighboring micro-wires 150 in an electrode by a distance of 50 microns, so that the transparent electrode is 90% transparent. As used herein, transparent refers to elements that transmit at least 50% of incident visible light. The micro-wires 150 can be arranged in a micro-pattern that is unrelated to the pattern of the transparent electrodes. Micro-patterns other than those illustrated in the Figures can be used in other embodiments and the present invention is not limited by the micro-pattern of the micro-wires 150 or the pattern of the first and second transparent electrodes 130, 132. Each transparent electrode can be 1,000 microns wide (and thus include 20 micro-wires across its width) and separated from neighboring electrodes by a distance of 333.3 microns. Therefore, each pad area is 1,000 microns by 1,000 microns, each first interstitial area 12 is 333.3 microns by 1,000 microns and each second interstitial area 14 is 1,000 microns by 333.3 microns. If the electrodes on each transparent substrate are aligned, this results in a transparent substrate with a transparency of $\{(90\% \times 9)+(90\% \times 6)+(100\% \times 1)\}/16$ corresponding to the transparency of the pad area, the interstitial area, and the area with no electrodes and equal to 90.6%.

FIG. 14A is a cross section of the structures shown in FIGS. 1A and 3. In this embodiment of the present invention, a touch-responsive capacitor apparatus 10 includes a first transparent substrate 122 on which is formed first transparent electrodes 130 and a second transparent substrate 126 on which is formed second transparent electrodes 132 orthogonal to the first transparent electrodes 130. The first transparent electrode 130 includes interstitial micro-wires 22 and pad micro-wires 24 as does second transparent electrode 132 (e.g. 23, not shown for second transparent electrode 132, 25). The first and second transparent electrodes 130, 132 face each other on opposite sides of a dielectric layer 124. A plurality of spaced-apart first and second pad areas 128 and 129 whose capacitance changes in response to a touch is formed where the first and second transparent electrodes 130, 132 are adjacent or overlap. A plurality of spaced-apart first interstitial areas 12 is formed on the first transparent substrate 122 in the first transparent electrode 130. A plurality of spaced-apart second interstitial areas 14 is formed on the second transparent substrate 126 in the second transparent electrode 132 spaced apart from the second pad areas 129.

Referring to FIG. 14B in an alternative embodiment of the present invention, a touch-responsive capacitor apparatus 10 includes a transparent substrate 123 having first and second sides 123A, 123B, respectively. A first transparent electrode 130 is formed on or over the first side 123A of the transparent substrate 123 and includes first pad micro-wires 24 and first interstitial micro-wires 22 formed in a first micro-wire layer. A second orthogonal transparent electrode 132 is formed on or under the second side 123B of the transparent substrate 123 and also includes second pad micro-wires 25 and second interstitial micro-wires 23 (not shown) formed in a second micro-wire layer different from the first micro-wire layer. A plurality of spaced-apart first and second pad areas 128, 129 pairs is formed that define capacitors whose capacitance changes in response to a touch. (The first pad areas 128 are at a different depth in the Figure from the second pad areas 129.) A plurality of spaced-apart first interstitial areas 12 is formed over the first side 123A of the transparent substrate 123 and spaced apart from the first pad areas 128. A plurality of spaced-apart second interstitial areas 14 is formed under the second side 123B of the transparent substrate 123 and spaced apart from the second pad areas 129 and from the first interstitial areas 12 (in an orthogonal dimension).

A first plurality of first interstitial micro-wires 22 are formed over the first side 123A of the transparent substrate 124 in a first micro-wire layer in the first interstitial areas 12. A first plurality of first pad micro-wires 24 is formed over the first side 123A of the transparent substrate 123 in the first micro-wire layer in the first pad areas 128 and the first pad micro-wires 24 are electrically connected to the first interstitial micro-wires 22. A second plurality of second interstitial micro-wires 23 are formed under the second side 123B of the transparent substrate 123 in the second interstitial areas 14 in a second micro-wire layer different from the first micro-wire layer. A second plurality of second pad micro-wires 25 are formed on or under the second side 123B of the transparent substrate 123 in the second micro-wire layer in the second pad areas 129 (that can overlap first pad areas 128) and are electrically connected to the second plurality of second interstitial micro-wires 23. A dielectric layer 124 is located between the first and second pluralities of micro-wires. In an embodiment, the dielectric layer 124 provides the transparent substrate 123. Alternatively, the dielectric layer 124 is a layer separate from the transparent substrate 123. The micro-pattern of at least a portion of the first interstitial micro-wires 22 in the first interstitial area 12 is dissimilar from the micro-pattern of at least a portion of the first pad micro-wires 24 in the first pad area 128 over the first side 123A or the micro-pattern of at least a portion of the second interstitial micro-wire 23 in the second interstitial area 14 is dissimilar from the micro-pattern of at least a portion of the second pad micro-wires 25 in the second pad area 129 under the second side 123B.

In a further embodiment of the present invention, first pad and first interstitial micro-wires 24, 22 forming first and second transparent electrodes 130, 132 having first and second pad areas 128, 129 and first and second interstitial areas 12, 14 are located on either side of a dielectric layer 124. Thus, the dielectric layer 124 has a first side and a second side opposite the first side. The first side is adjacent the first micro-wire layer and the second micro-wire layer is formed under the second side of the dielectric layer 124.

In a further embodiment of the present invention and as illustrated in FIGS. 1A, 1B, 2A, 2B, and 3, a first plurality of the first interstitial and first pad micro-wires 22, 24 form an array of first separated transparent electrodes 130 arranged in a first direction and a second plurality of the second interstitial and second pad micro-wires 22, 24 form an array of second separated transparent electrodes 132 arranged in a second direction different from the first direction, for example an orthogonal direction. The first transparent electrodes 130 can overlap or be adjacent to the second transparent electrodes 132 in the first or second pad areas 128, 129. Likewise, the first transparent electrodes 130 can overlap or be adjacent to the second transparent electrodes 132 in the first or second interstitial areas 12, 14.

There are various methods of the present invention that can be employed to construct the various embodiments of the present invention. Referring to FIG. 15A, a method of making a transparent touch-responsive capacitor apparatus 10 includes providing a transparent substrate 123 and defining a plurality of first pad areas 128 and first interstitial areas 12 in a first micro-wire layer and defining a plurality of second pad areas 129 and second interstitial areas 14 in a second micro-wire layer, pairs of first and second pad areas 128, 129 defining corresponding touch-responsive capacitors, the first and second micro-wire layers supported by the transparent substrate 123 in step 200.

In step 205, a plurality of electrically connected first pad micro-wires 24 are formed in the first pad areas 128 in the first micro-wire layer and a plurality of electrically connected first interstitial micro-wires 22 are formed in the first interstitial areas 12 in the first micro-wire layer, the first pad micro-wires 24 electrically connected to the first interstitial micro-wires 22. A plurality of electrically connected second pad micro-wires 25 are formed in the second pad areas 129 in the second micro-wire layer and a plurality of electrically connected second interstitial micro-wires 23 are formed in the second interstitial areas 14 in the second micro-wire layer, the second pad micro-wires 25 electrically connected to the second interstitial wires 23. The micro-pattern of at least a portion of the first interstitial micro-wires 22 is dissimilar from the micro-pattern of at least a portion of the first pad micro-wires 24.

There are several different ways in which the micro-wires 150 (e.g. 22, 23, 24, 25) can be formed according to various methods of the present invention. In one embodiment, the micro-wires 24, 25 in the first and second pad areas 128, 129 are made at the same time and with the same processing step as the micro-wires 22, 23 in the first and second interstitial areas 12, 14. In another embodiment, the micro-wires 24, 25 in the first and second pad areas 128, 129 are made in a different processing step from the micro-wires 22, 23 in the first and second interstitial areas 12, 14. In the latter case, referring to FIG. 15B, the micro-wires 24, 25 in the first and second pad areas 128, 129 can be made in step 210 separately from the micro-wires 22, 23 in the first and second interstitial areas 12, 14 in step 215.

Figure 16B:
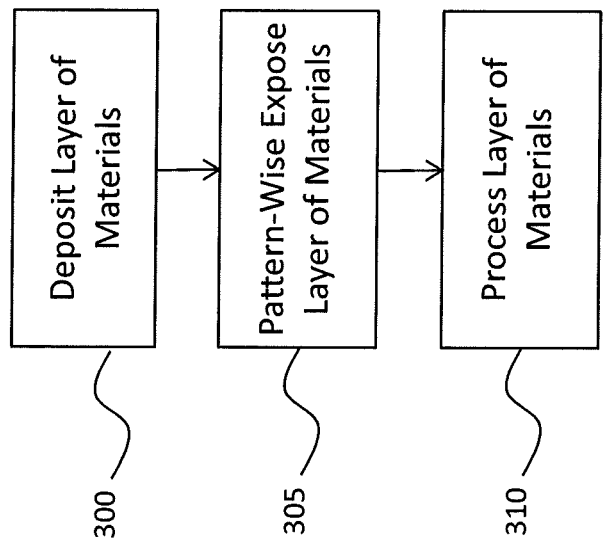
FIGS. 16A and 16B are flow diagrams illustrating various methods of various embodiments of the present invention.
Figure 16A:
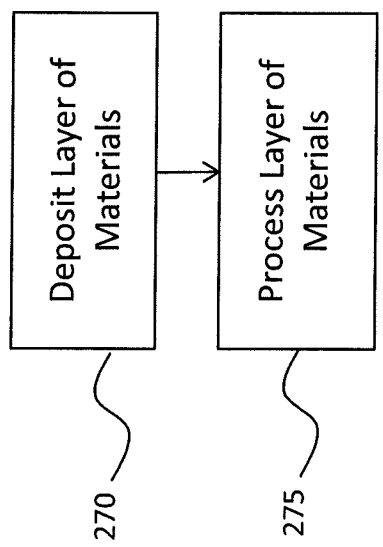

In other embodiments of the present invention, the different micro-wires are made by depositing an unpatterned layer of material and then differentially processing the layer to form the different micro-wire micro-patterns. For example, a layer of curable precursor material is coated over the substrate, pattern-wise cured in a first micro-pattern in a first area and pattern-wised cured in a second, dissimilar micro-pattern in a second area to form electrically conductive micro-wires. The first and second micro-patterns are exposed in a common step or in different steps. Referring to FIG. 16A, a layer of materials is deposited on a transparent substrate 123 in step 270 and then processed in step 275. A variety of processing methods can be used, for example photo-lithographic or silver halide methods. The materials can be differentially pattern-wise exposed. Referring to FIG. 16B, a layer of materials can be deposited on a transparent substrate 123 in step 300, pattern-wise exposed in step 305, and then processed in step 310.

Figure 15B:
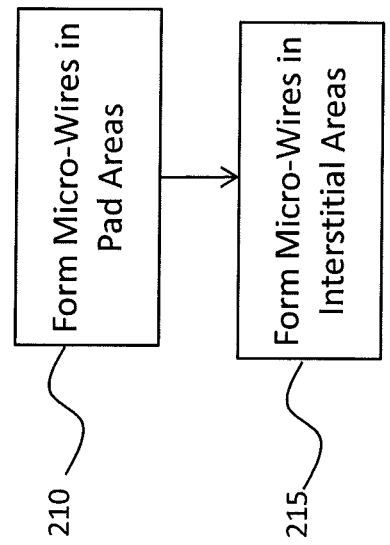
FIGS. 15A and 15B are flow diagrams illustrating various methods of various embodiments of the present invention.
Figure 15A:
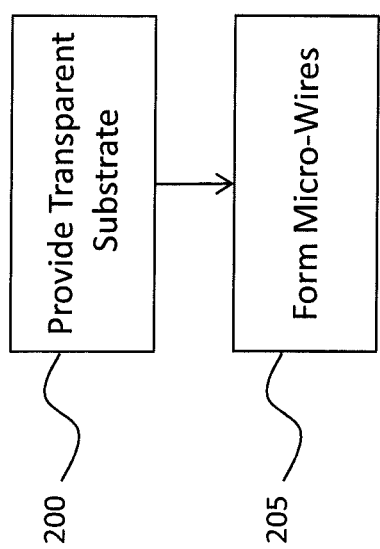

In any of these cases, the micro-wires 24, 25 in the first and second pad areas 128, 129 can be made before, after, or at the same time as the micro-wires 22, 23 in the first and second interstitial areas 12, 14 on any of the transparent substrates 123 (e.g. in FIG. 15B).

Thus, in another embodiment of the present invention illustrated in FIGS. 16A and 16B, a method of making a transparent touch-responsive capacitor apparatus 10 includes providing a transparent substrate 123; defining a plurality of first and second spaced-apart pad areas 128, 129 over the transparent substrate 123, pairs of first and second pad areas 128, 129 defining corresponding touch-responsive capacitors, and defining a plurality of first interstitial areas 12 spaced apart from the first pad areas 128 and a plurality of second interstitial areas 14 spaced apart from the second pad areas 129; forming a material layer over the transparent substrate 123; forming a plurality of electrically connected first interstitial micro-wires 22 over the transparent substrate 123 in the material layer; forming a plurality of electrically connected first pad micro-pattern elements 164 over the transparent substrate 123 in the material layer, the first interstitial micro-wires 22 electrically connected to the first pad micro-pattern elements 164; and wherein the micro-pattern 156 of at least a portion of the first interstitial micro-wires 22 is dissimilar from the micro-pattern 156 of at least a portion of the first pad micro-pattern elements 164.

Figure 17B:
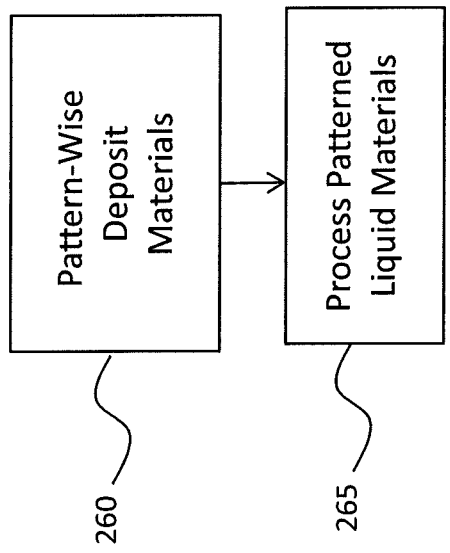
FIGS. 17A and 17B are flow diagrams illustrating various methods of various embodiments of the present invention.
Figure 17A:
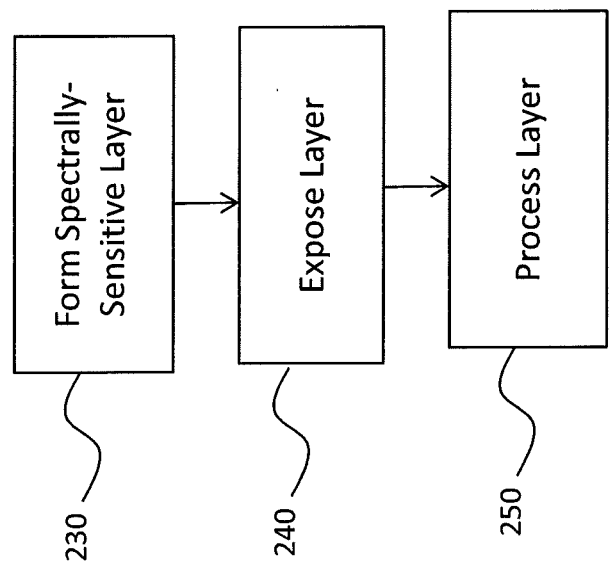

In a further embodiment of the present invention, referring to FIG. 17A, precursor layers of spectrally photo-sensitive precursor materials on the transparent substrate 123 are formed in step 230. The layer is sensitive to a spectrum. The photo-sensitive pre-cursor materials in the interstitial area are pattern-wise exposed in first and second micro-patterns 157, 158 to spectrum light in step 240 to expose the precursor material layers. The first and second micro-patterns 157, 158 define the plurality of electrically connected first micro-wires 150 and the plurality of electrically connected second micro-wires 150. Alternatively, the first and second micro-patterns 157, 158 can be exposed in separate steps. The photo-sensitive precursor materials in both layers in the first and second pad areas 128, 129 and the first and second interstitial areas 12, 14 are processed in step 250 to form the micro-wires 150.

A variety of materials can be employed to form the patterned layer, including resins that can be cured by cross-linking wave-length-sensitive polymeric binders and silver halide materials that are exposed to light. Processing can include both washing out residual uncured materials and curing or exposure steps.

Figure 18:
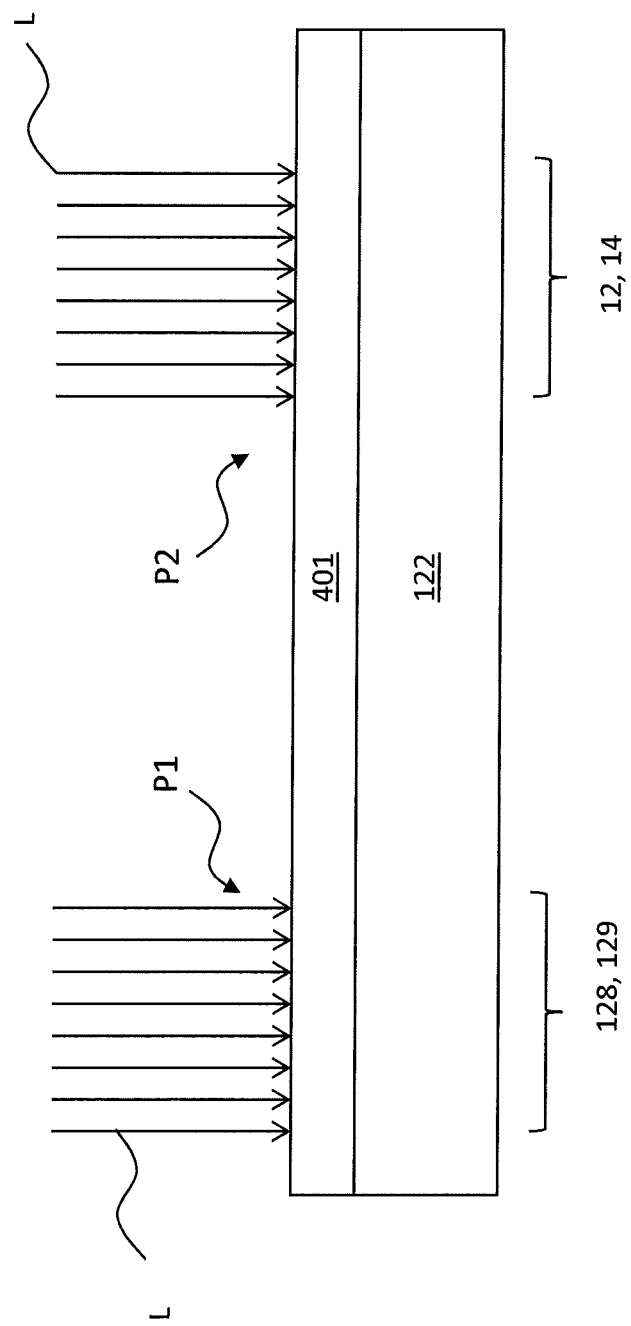
FIG. 18 is a schematic of a layer structure useful in understanding a method of the present invention.

In order to enhance the sensitivity of the precursor material layers to the spectrum, in another embodiment of the present invention, the layer includes a spectrally-sensitive radiation-absorbing material. For example, the spectrally-sensitive radiation-absorbing material can be a dye that preferentially absorbs radiation used to pattern-wise expose the materials. Referring to FIG. 18, a layer 401 of a spectrally photo-sensitive precursor material is coated on a first transparent substrate 122. Light L of a spectrum selectively exposes the layer 401 with first pad micro-patterns (P1) and second interstitial micro-patterns P3, for example corresponding to the pattern of the first or second pad micro-wires 24, 25 in the first or second pad areas 128, 129 and corresponding to the pattern of the first or second interstitial micro-wires 22, 23 in the first or second interstitial areas 12, 14. Thus, the photo-sensitive precursor material in the first layer 401 forms micro-wires 24, 25 in the first and second pad areas 128, 129 and the first and second interstitial areas 12, 14. In a processing step, the exposed layer can be developed (e.g. cross-linked) and unexposed materials removed to form the first or second pad micro-wires 24, 25 and first or second interstitial micro-wires 22, 23.

In an embodiment, the precursor layer includes conductive ink, conductive particles, or metal ink. The exposed portions of the layers can be cured to form the micro-wires (for example by exposure to patterned laser light to cross-link a curable resin) and the uncured portions removed. Alternatively, unexposed portions of the first and second micro-wire layers can be cured to form the micro-wires and the cured portions removed.

In another embodiment of the present invention, the precursor layers are silver salt layers. The silver salt can be any material that is capable of providing a latent image (that is, a germ or nucleus of metal in each exposed grain of metal salt) according to a desired pattern upon photo-exposure. The latent image can then be developed into a metal image.

For example, the silver salt can be a photosensitive silver salt such as a silver halide or mixture of silver halides. The silver halide can be, for example, silver chloride, silver bromide, silver chlorobromide, or silver bromoiodide.

Generally, the silver salt layer includes one or more hydrophilic binders or colloids. Non-limiting examples of such hydrophilic binders or colloids include but are not limited to hydrophilic colloids such as gelatin or gelatin derivatives, polyvinyl alcohol (PVA), polyvinylpyrrolidone (PVP), casein, and mixtures thereof.

In many embodiments, the binder in the silver salt layer (or any other layer) includes one or more hardeners designed to harden the particular binder such as gelatin. Particularly useful hardeners include, but are not limited to, non-polymeric vinyl-sulfones such as bis(vinyl-sulfonyl) methane (BVSM), bis(vinyl-sulfonyl methyl)ether (BVSME), and 1,2-bis(vinyl-sulfonyl acetoamide)ethane (BVSAE). Mixtures of hardeners can be used if desired.

One useful photosensitive silver salt composition is a high metal (for example, silver)/low binder (for example, gelatin) composition, that after silver salt development, is sufficiently conductive. Where the photosensitive silver salt layer includes an emulsion of silver halide dispersed in gelatin, a particularly useful weight ratio of silver to gelatin is 1.5:1 or higher in the silver salt layer. In certain embodiments, a ratio between 2:1 and 3:1 in the silver salt layer is particularly useful.

According to many embodiments, the useful silver salt is a silver halide (AgX) that is sensitized to any suitable wavelength of exposing radiation. Organic sensitizing dyes can be used to sensitize the silver salt to visible or IR radiation, but it can be advantageous to sensitize the silver salt in the UV portion of the electromagnetic spectrum without using sensitizing dyes.

Processing of AgX materials to form conductive traces typically involves at least developing exposed AgX and fixing (removing) unexposed AgX. Other steps can be employed to enhance conductivity, such as thermal treatments, electroless plating, physical development and various conductivity enhancing baths, e.g., as described in U.S. Pat. No. 3,223,525.

In an embodiment, a method of making a transparent conductor structure useful for touch screen and other electronic devices includes providing a transparent conductor precursor structure. The transparent conductor precursor structure includes a transparent substrate, a first precursor material layer formed over the transparent substrate and a second precursor material layer formed on the first precursor material layer. A plurality of electrically connected first micro-wires is formed in the first and second precursor material layers within a first transparent conductor area. That is, the conductive micro-wire spans at least a portion of both the first and second precursor material layers.

A plurality of electrically connected second micro-wires are formed in either the first precursor material layer or the second precursor material layer within a second transparent conductor area, the second micro-wires electrically connected to the first micro-wires. Where the second micro-wires are formed in the first precursor material layer, some portion of a second micro-wire is formed in the second precursor material layer as well, but in a lesser amount than in the first precursor material layer. In a useful embodiment, substantially no portion of the second micro-wire is formed in the second precursor material layer. Similarly, where the second micro-wires are formed in the second precursor material layer, some smaller portion of a second micro-wire is formed in the first precursor material layer. It is particularly useful if there is substantially no portion of the micro-wire formed in the first precursor material layer.

To achieve transparency, the total area occupied by the first micro-wires is less than 15% of the first transparent conductor area and the total area occupied by the second micro-wires is less than 15% of the second transparent conductor area. The transparent conductive structure can include a plurality of first and second transparent conductor areas.

As in embodiments described above, the first precursor material layer is photosensitive to a first-spectrum light and the second precursor material layer is photosensitive to a second-spectrum light different from the first spectrum light. In some embodiments, the first precursor material layer is also photosensitive to the second-spectrum light and the second precursor material layer is substantially insensitive to first-spectrum light.

In an embodiment, the transparent precursor material layer is pattern-wise exposed in the first transparent conductor area to second-spectrum light, and optionally to first-spectrum light, defining the plurality of electrically connected first micro-wires. The transparent precursor material layer is also pattern-wise exposed in the second transparent conductor area to first-spectrum light defining the plurality of electrically connected second micro-wires. After exposure, the precursor material layer is processed to form the first and second micro-wires. In a particularly useful embodiment, the first and second precursor material layers each include a photosensitive precursor material, e.g., silver halide, provided in a binder material, such as gelatin.

In an embodiment, the transparent precursor material layer is pattern-wise exposed in the first transparent conductor area to first-spectrum light and second-spectrum light, defining the plurality of electrically connected first micro-wires. The transparent precursor material layer is pattern-wise exposed in the second transparent conductor area to first- or second-spectrum light defining the plurality of electrically connected second micro-wires. If formation of the second micro-wires is desired primarily in the first precursor material layer, first-spectrum light is used. Alternatively, if formation of the second micro-wires is desired primarily in the second precursor material layer, second-spectrum light is used. After exposure, the transparent precursor material layer is processed to form the first and second micro-wires. In a particularly useful embodiment, the first and second precursor material layers each include a photosensitive precursor material, e.g., silver halide, provided in a binder material, such as gelatin.

In an embodiment, the first and second precursor material layers can each include a metallic particulate material or a metallic precursor material, and a photosensitive binder material.

As noted above with reference to FIG. 15B, in an embodiment the one or more first pad micro-wires 24 in the first pad area 128 are formed in the first step and the one or more first interstitial micro-wires 22 in the first interstitial area 12 are formed in the second step. For example, referring to FIG. 17B, first precursor material is deposited in the first pad area 128 in step 260 and pattern-wise processed in step 265. The precursor materials can be liquid (for example a conductive, curable ink) and can be blanket coated in one step and pattern-wise cured by pattern-wise exposing the blanket coating in the pad and interstitial areas.

In an alternative embodiment, precursor material is pattern-wise deposited and cured in the first pad area 128 and in the first interstitial area 12 (e.g. corresponding to the process illustrated in FIG. 15B). Thus, the one or more first pad micro-wires 24 are formed in the first pad area 128 and a portion of each of the one or more first pad micro-wires 24 are formed in the first interstitial area 12 in a first step. The first precursor material is deposited in the first pad area 128 and in the first interstitial area 12 and then they are pattern-wise processed. The deposition can include blanket-coating the transparent substrate 123 and pattern-wise exposing the blanket coating. Blanket coating methods are known in the art, for example by spin coating or curtain coating.

In another embodiment of the present invention, the steps include the pattern-wise transfer of precursor material from a source to the transparent substrate 123.

In another embodiment of the present invention, precursor materials are deposited in a single layer, for example in a single step, and then pattern-wise defined in one or more steps. In such a method, a transparent substrate 123 is provided. A plurality of first and second spaced-apart pad areas 128, 129 is defined over the transparent substrate 123, pairs of first and second pad areas 128, 129 defining corresponding touch-responsive capacitors. A plurality of first interstitial areas 12 spaced apart from the first pad areas 128 and a plurality of second interstitial areas 14 spaced apart from the second pad areas 129 are defined. A material layer is formed over the transparent substrate 123. A plurality of electrically connected first interstitial micro-wires 22 is pattern-wise defined over the transparent substrate 123 in the material layer in the first interstitial areas 12. A plurality of electrically connected pad micro-wires is pattern-wise defined over the transparent substrate 123 in the material layer in the first pad areas 128. The first interstitial micro-wires 22 are electrically connected to the first pad micro-wires 24. The micro-pattern of at least a portion of the first interstitial micro-wires 22 is dissimilar from the micro-pattern 156 of at least a portion of the first pad micro-wires 24.

In these embodiments, the second pad micro-wires 25 in the second pad area 129 and the second interstitial micro-wires 23 in the second interstitial area 14 can be formed in way analogous to the formation of the first pad micro-wires 24 and first interstitial micro-wires 22.

Figure 19:
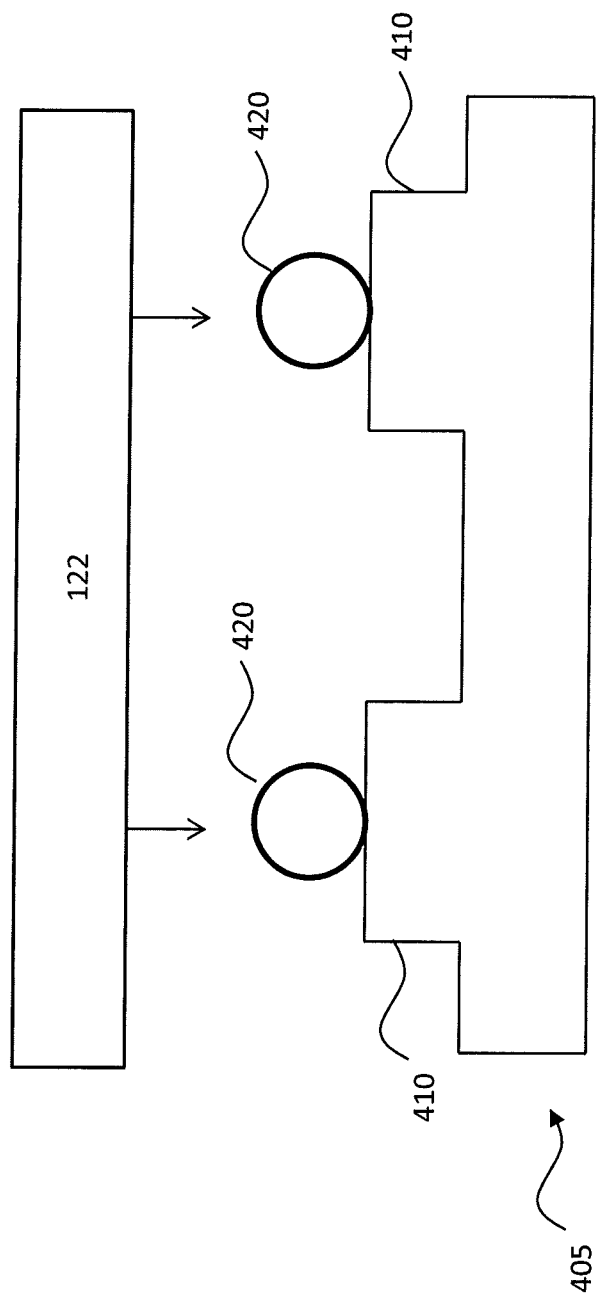
FIG. 19 is a schematic of a printing plate useful in understanding a method of the present invention.

Referring to FIG. 19, in an embodiment of the present invention, a printing plate 405 is provided. The printing plate has flexible raised areas 410. A flexible raised area is one which can be compressed when brought into contact with a rigid surface. A material 420 is deposited on the raised areas 410 on the printing plate 405. A first transparent substrate 122 is located in contact with the first and second raised areas 410 to transfer material from the raised areas 410 on to the first transparent substrate 122. Because the raised areas 410 are flexible, the raised area 410 can be compressed by the first transparent substrate 122 so that the first transparent substrate 122 surface is brought into contact with the material 420 on the raised areas 410. The material 420 is then transferred from the raised areas 410 to define the plurality of electrically connected micro-wires 150. The transferred material 420 is then processed as needed to form the micro-wires 150. The amount of material 420 transferred from the raised areas 410 to the first transparent substrate 122 depends on a variety of factors, including the viscosity of the material 420, the height of the raised areas 410, and the temperatures of the material 420, the raised areas 410, or the transparent substrate 123. Flexographic printing plates having flexible raised areas 410 are known in the art.

In a further embodiment of the present invention, a photo-sensitive precursor material is coated on the transparent substrate 123 and pattern-wise first exposed in the first interstitial area 12 to define the plurality of electrically connected first pad micro-wires 24. The photo-sensitive precursor material 420 in the first pad area 128 is pattern-wise second exposed to define the plurality of electrically connected second micro-wires. The second exposure is different from the first exposure. The photo-sensitive precursor material is processed in both the first pad and the first interstitial areas 128, 12 to form the one or more micro-wires 150.

In any of these cases, the precursor material is conductive after it is cured and any needed processing completed. Before patterning or before curing, the precursor material is not necessarily electrically conductive. As used herein, precursor material is material that is electrically conductive after any final processing is completed and the precursor material is not necessarily conductive at any other point in the micro-wire formation process.

Figure 20:
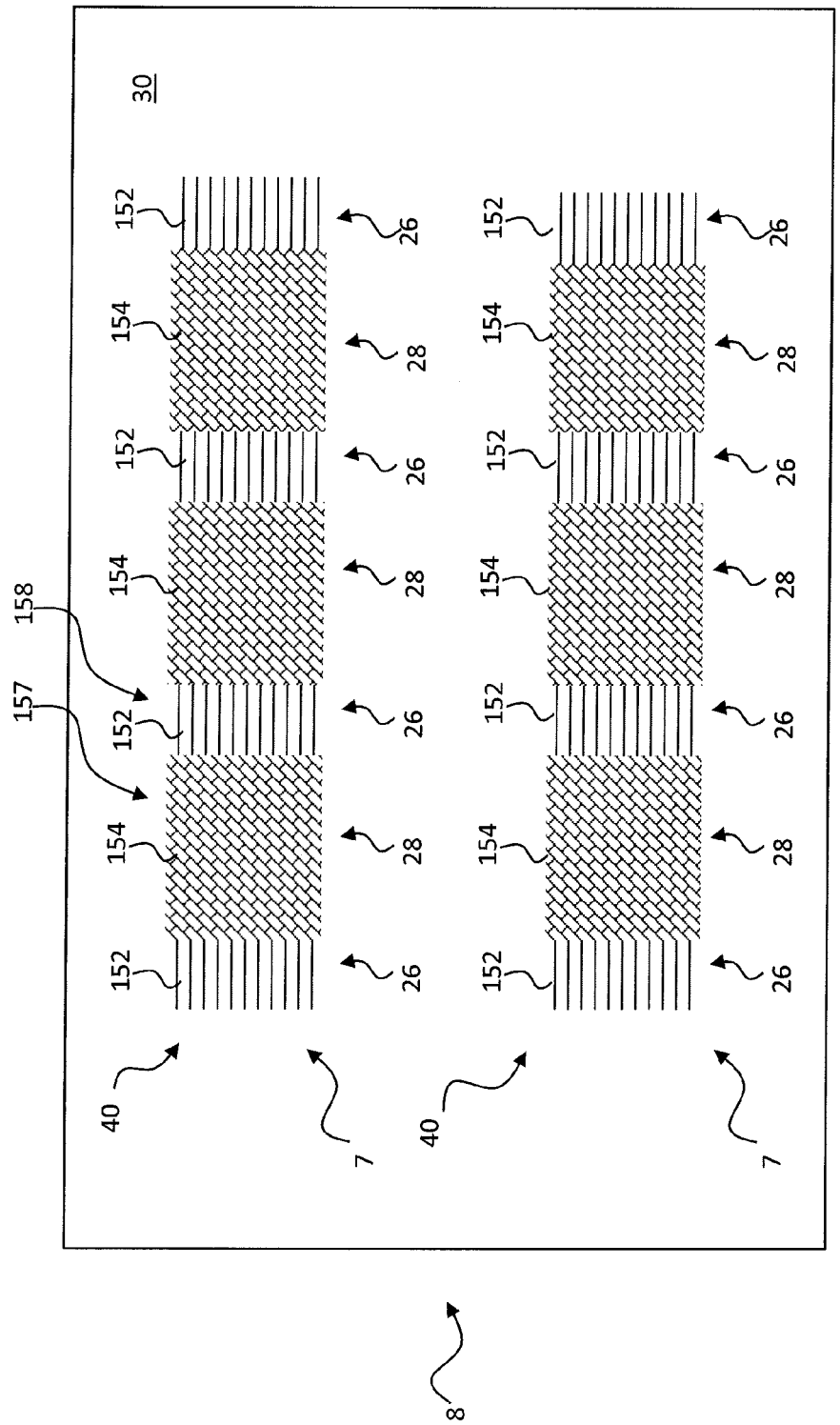
FIG. 20 is a top view of an embodiment of the present invention.

Referring to FIG. 20 in a further embodiment of the present invention, an electronic device 8 includes a support 30 having greater than 80% transmittance to light at 550 nm and a transparent conductor area 40 provided over at least a portion of one side of the support 30. The support 30 can be a transparent substrate, for example similar to first or second transparent substrates 122, 126, or transparent substrate 123 (FIG. 1A, 4B). The transparent conductor area 40 can be, for example a transparent electrode such as first transparent electrodes 130 or second transparent electrodes 132 (FIG. 1A, 2A, 2B).

Figure 21:
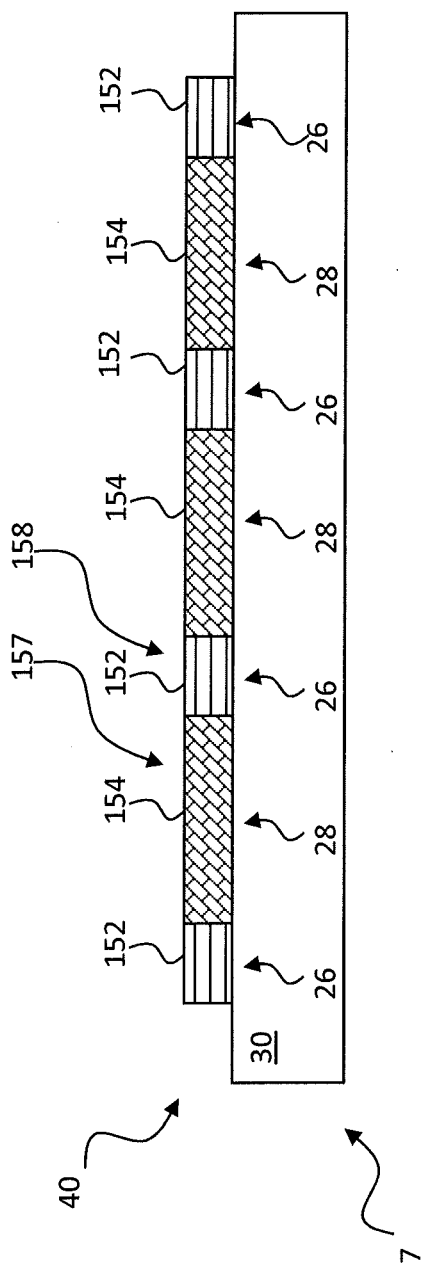
FIG. 21 is a cross section of an embodiment of the present invention.

Referring also to FIG. 21, the transparent conductor area 40 includes first conductive metallic micro-wires 152 provided in first locations 26 in a first micro-pattern 157, the first conductive metallic micro-wires 152 having a width greater than or equal to 0.5 um and less than or equal to 20 um. Second conductive metallic micro-wires 154 are provided in second locations 28 different from the first locations 26 in a second micro-pattern 158. The second conductive metallic micro-wires 154 have a width in a range of 0.5 um to 20 um. The first and second metallic micro-wires 152, 154 can correspond to the first interstitial micro-wires 22 and the first pad micro-wires 24, respectively or the second interstitial micro-wires 23 and the second pad micro-wires 25, respectively. The first and second metallic micro-wires 152, 154 occupy an area less than 15% of the transparent conductor area 40.

As shown in FIG. 20, the electronic device 8 further can include a plurality of transparent conductor areas 40, each transparent conductor area 40 forming a first and second transparent electrode (e.g. 130, 132) having first and second locations 26, 28 and having a length and a width. In one embodiment as shown in FIG. 2A, the width of the first and second transparent electrodes 130, 132 varies along the length of the first and second transparent electrodes 130, 132 to form wide and narrow transparent electrode areas. The first metallic micro-wires 152 are provided in wide transparent electrode areas (for example the first and second pad areas 128, 129) and the second metallic micro-wires 154 are provided in the narrow transparent electrode areas (for example the first and second interstitial areas 12, 14).

The second micro-wires 154 can have a greater conductivity than the first conductive metallic micro-wires 152. The second conductive metallic micro-wires 154 can be made of the same, or different, materials as the first conductive metallic micro-wires 152. The first and second conductive metallic micro-wires 152, 154 can occupy an area less than or equal to 10% of the area of the transparent conductor area 40. The transparent conductor area 40 can have a transparency greater than 80% transmittance to light at 550 nm and the combined transparency of the support 30 and the transparent conductor area 40 is greater than 80% in a wavelength range of 450 to 650 nm.

In an alternative embodiment, an electronic device 8 includes a transparent conductor apparatus 7 (for example, having an electrode, such as first or second transparent conductor electrode 130 or 132) includes a transparent substrate 123 having a first area and a second area different from the first area (e.g. pad areas 128, 129 and interstitial areas 12, 14). A plurality of electrically connected first micro-wires 150 are formed on the transparent substrate 123 in a first micro-pattern 157 in the first area and a plurality of electrically connected second micro-wires 150 are formed on the transparent substrate 123 in a second micro-pattern 158 in the second area electrically connected to the first micro-wires 150. The first micro-pattern 157 is dissimilar from the second micro-pattern 158.

Figure 22:
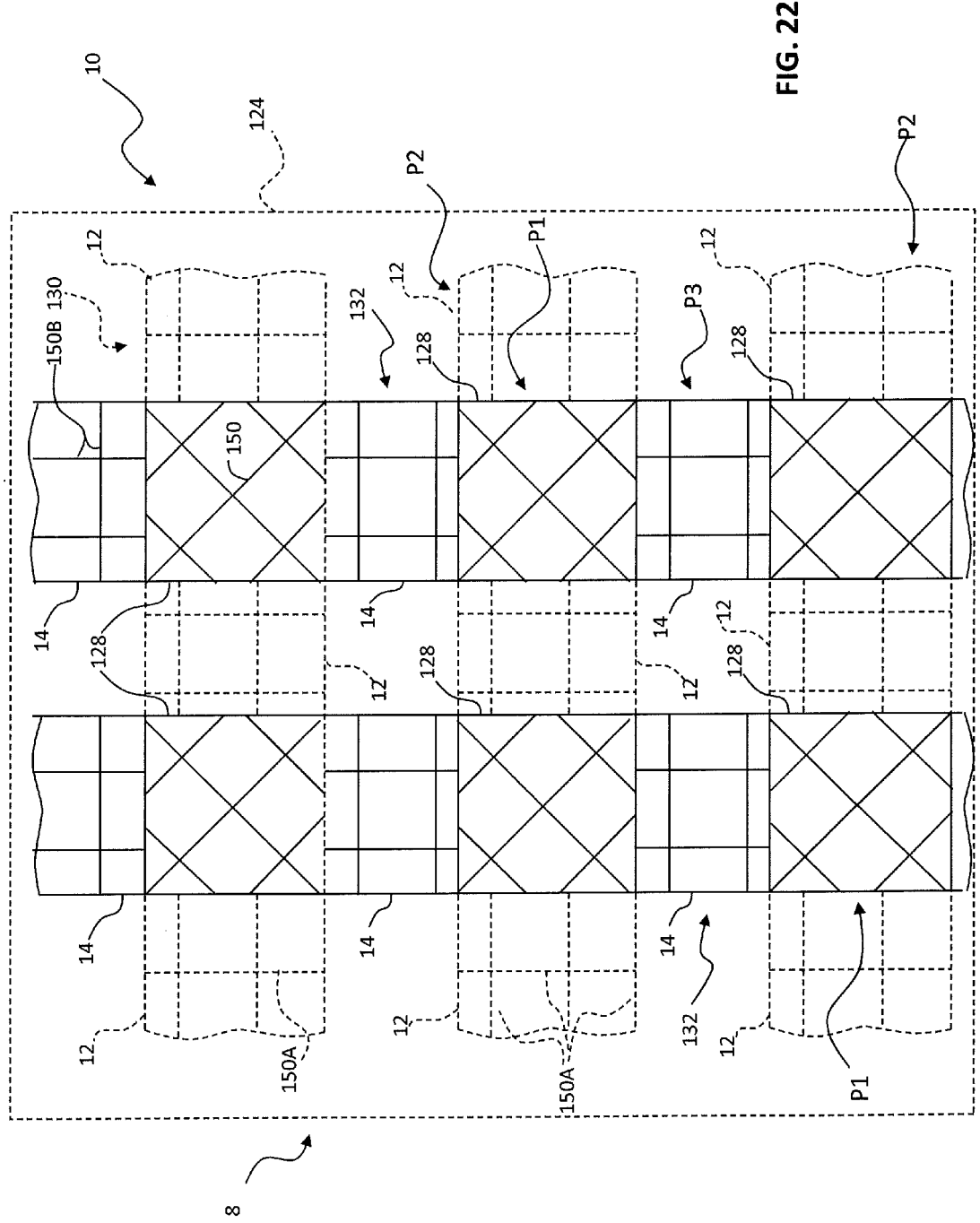
FIG. 22 is a top view of an embodiment of the present invention.
Figure 23:
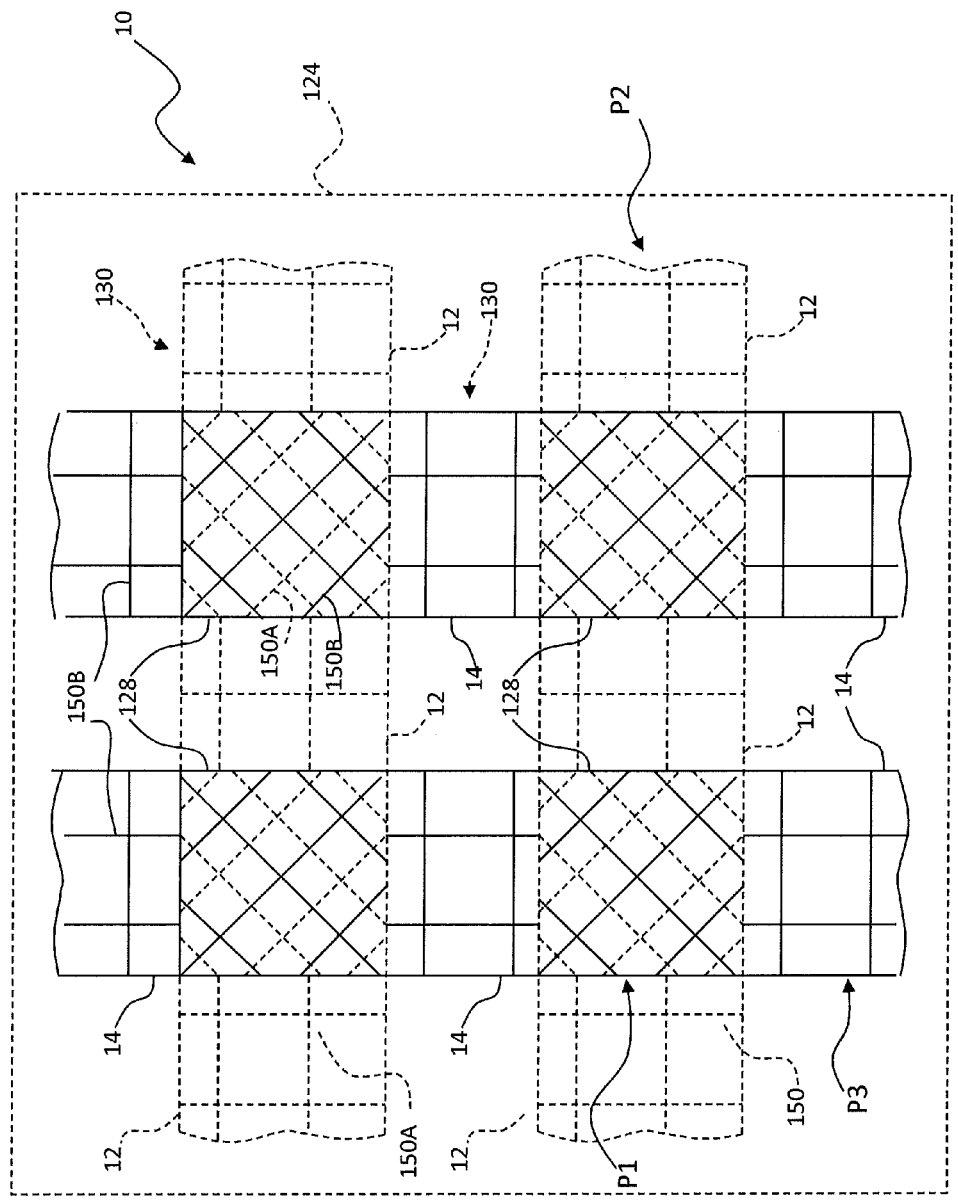
FIG. 23 is a top view of an embodiment of the present invention.

Referring to the top view of FIG. 22, in this embodiment micro-wires 150A are formed in interstitial areas 12 of first transparent electrode 130 and micro-wires 150B are formed in second interstitial areas 14 of second transparent electrode 132. In the first pad areas 128 where the first transparent electrodes 130 overlap the second transparent electrodes 132 the micro-wires 150 are coincident. Referring also to FIG. 23, in the first pad areas 128 where the first transparent electrodes 130 overlaps the second transparent electrodes 132 the micro-wires 150A of the first transparent electrodes 130 are offset with respect to the micro-wires 150B of the second transparent electrodes 132. Furthermore, in an embodiment, micro-wires 150 in interstitial areas 12 in first transparent electrode 130 are coincident with micro-wires 150 in second interstitial areas 14 in second transparent electrode 132. Alternatively, micro-wires 150 in interstitial areas 12 in first transparent electrode 130 are not coincident with micro-wires 150 in second interstitial areas 14 in second transparent electrode 132.

It is known in the art that some touch screen designs using micro-wires can optionally include "dummy areas" outside the conductive areas where conductive micro-wires are formed, but are not electrically connected to any addressable electrode, for primarily optical purposes. Although the conductive areas are largely transparent, they can have slightly more light absorption than neighboring non-conductive areas. This can sometimes be observed by a viewer. Thus, in order to maintain a uniform appearance, dummy areas include some micro-wire patterns to maintain a similar overall light absorption.

In another embodiment, the transparent conductors are connected to bus lines having a width significantly greater than the micro-wires. Bus lines are often outside of an intended viewing area. Nevertheless, in an embodiment the bus lines are formed in a manner similar to the interstitial or pad micro-wires.

Although the present invention has been described with emphasis on capacitive touch screen embodiments, the transparent electrode structures are useful in a wide variety of electronic devices. Such devices can include, for example, photovoltaic devices, OLED displays and lighting, LCD displays, plasma displays, inorganic LED displays and lighting, electrophoretic displays, electrowetting displays, dimming mirrors, smart windows, transparent radio antennae, transparent heaters and other touch screen devices such as resistive touch screen devices.

The invention has been described in detail with particular reference to certain embodiments thereof, but it will be understood that variations and modifications can be effected within the spirit and scope of the invention.

PARTS LIST

C1 capacitor area length 1
E1 electrode area length 1
L light
L1 micro-pattern element length 1
L2 micro-pattern element length 2
P1 $1^{st}$ and $2^{nd}$ pad micro-pattern
P2 first interstitial micro-pattern
P3 second interstitial micro-pattern
7 transparent conductor apparatus
8 electronic device
10 touch-responsive capacitive apparatus
12 first interstitial area
14 second interstitial area
22 first interstitial micro-wires
23 second interstitial micro-wires
24 first pad micro-wires
25 second pad micro-wires
26 first locations
28 second locations
30 support
40 transparent conductor area
100 touch screen and display system
110 display
120 touch screen
122 first transparent substrate
123 transparent substrate
123A first side
123B second side
124 dielectric layer
126 second transparent substrate
128 first pad area
129 second pad area
130 first transparent electrode
132 second transparent electrode
134 wires
136 buss connections
140 touch screen controller
142 display controller
150 micro-wires
150A micro-wires
150B micro-wires
152 first conductive metallic micro-wires
154 second conductive metallic micro-wires
156 micro-pattern
157 first micro-pattern
158 second micro-pattern
162 interstitial micro-pattern elements
164 pad micro-pattern elements
172 shortest distance across interstitial micro-pattern area
174 shortest distance across pad micro-pattern area
175 pad micro-pattern side
176 pad micro-pattern side, interstitial micro-pattern side
177 interstitial micro-pattern side
200 provide transparent substrate step
205 form micro-wires step
210 form micro-wires in pad areas step
215 form micro-wires in interstitial areas step
230 form spectrally sensitive layer step
240 expose layer step
250 process layer step
260 pattern-wise deposit liquid materials step
265 process patterned liquid material step
270 deposit layer of materials step
275 process layer of materials step
300 deposit layer of materials step
305 pattern-wise expose layer of materials step
310 process layer of materials step
401 layer of spectrally sensitive material
405 printing plate
410 raised area
420 material

The invention claimed is:

1. A touch-responsive capacitive apparatus, comprising:
a transparent substrate;
a plurality of electrically connected first pad micro-wires formed in a first pad micro-pattern in first pad areas in a first micro-wire layer and a plurality of electrically connected first interstitial micro-wires formed in a first interstitial micro-pattern in first interstitial areas in the first micro-wire layer, the first pad micro-wires electrically connected to the first interstitial wires and one or more first pad micro-wires in a first pad area is electrically connected to one or more first pad micro-wires in another first pad area by one or more first interstitial micro-wires;
a plurality of electrically connected second pad micro-wires formed in a second pad micro-pattern in second pad areas in a second micro-wire layer and a plurality of electrically connected second interstitial micro-wires formed in a second interstitial micro-pattern in second interstitial areas in the second micro-wire layer, the second pad micro-wires electrically connected to the second interstitial wires and one or more second pad micro-wires in a second pad area is electrically connected to one or more second pad micro-wires in another second pad area by one or more second interstitial micro-wires;
wherein the first or second micro-wire layers are supported by the transparent substrate, the first interstitial and first pad micro-wires form an array of first separated electrodes that extend in a first direction, the second interstitial and second pad micro-wires in the second micro-pattern form an array of second separated electrodes that extend in a second direction different from the first direction, the first pad areas of the first electrodes overlap the second pad areas of the second electrodes, and overlapping pairs of first and second pad areas define corresponding touch-responsive capacitors; and
wherein the first interstitial micro-pattern is dissimilar from the first pad micro-pattern or the second interstitial micro-pattern is dissimilar from the second pad micro-pattern and the electrical resistance of the first interstitial micro-wires across the first interstitial area is less than the electrical resistance of the first pad micro-wires across the first pad area or the electrical resistance of the second interstitial micro-wires across the second interstitial area is less than the electrical resistance of the second pad micro-wires across the second pad area.

2. The touch-responsive capacitive apparatus of claim 1, wherein the width of the first interstitial micro-wires is the same as the width of the first pad micro-wires.

3. The touch-responsive capacitive apparatus of claim 1, wherein the width of at least some of the first interstitial micro-wires are different from the width of the first pad micro-wires.

4. The touch-responsive capacitive apparatus of claim 3, wherein the width of at least some of the first interstitial micro-wires is greater than the width of the first pad micro-wires and the width of at least some of the first interstitial micro-wires is less than the width of the first pad micro-wires.

5. The touch-responsive capacitive apparatus of claim 1, wherein the electrical resistance of the first interstitial micro-wires is less than the electrical resistance of the first pad micro-wires.

6. The touch-responsive capacitive apparatus of claim 1, wherein the transparency of one or more first interstitial areas is greater than the transparency of one or more of the first pad areas.

7. The touch-responsive capacitive apparatus of claim 1, wherein the first interstitial micro-pattern is a rotation of the first pad micro-pattern.

8. The touch-responsive capacitive apparatus of claim 1, wherein the first interstitial micro-pattern length is different from the first pad micro-pattern length.

9. The touch-responsive capacitive apparatus of claim 1, further including a dielectric layer having a first side and a second side opposite the first side, the first side adjacent the first micro-wire layer and the second side adjacent the second micro-wire layer.

10. The touch-responsive capacitive apparatus of claim 8, wherein the transparent substrate provides the dielectric layer or the dielectric layer is separate from the transparent substrate.

11. The touch-responsive capacitive apparatus of claim 1, wherein the first pad micro-pattern is the same micro-pattern as the second pad micro-pattern.

12. The touch-responsive capacitive apparatus of claim 1, wherein the first interstitial micro-pattern is the same pattern as the second interstitial micro-pattern or wherein the first interstitial micro-pattern is a rotated second interstitial micro-pattern.

13. The touch-responsive capacitive apparatus of claim 1, wherein the resistance across the first interstitial area in a first direction is different from the resistance across the first interstitial area in a second direction different from the first direction.

14. The touch-responsive capacitive apparatus of claim 13, wherein the first interstitial micro-wires are orthogonal to the second interstitial micro-wires.

15. The touch-responsive capacitive apparatus of claim 1, wherein the first interstitial micro-wires overlap the second interstitial micro-wires or wherein the first pad micro-wires overlap the second pad micro-wires.

16. The touch-responsive capacitive apparatus of claim 1, wherein the first interstitial micro-wires are offset from the second interstitial micro-wires or wherein the first pad micro-wires are offset from the second pad micro-wires.

17. The touch-responsive capacitive apparatus of claim 1, further including a first transparent substrate layer on which the first micro-wire layer is formed and a second transparent substrate layer on which the second micro-wire layer is formed.

18. The touch-responsive capacitive apparatus of claim 1, wherein the first or second pad or interstitial micro-wires are a metal, a metal alloy, or include cured or sintered metal particles.

19. The touch-responsive capacitive apparatus of claim 18, wherein the metal is nickel, tungsten, silver, gold, titanium, or tin or includes nickel, tungsten, silver, gold, titanium, or tin.

20. The touch-responsive capacitive apparatus of claim 1, wherein:
the transparent substrate has greater than 80% transmittance to light at 550 nm;
the first pad micro-wires are metallic and have a width greater than or equal to 0.5 um less than or equal to 20 um;
the first interstitial micro-wires are metallic and have a width greater than or equal to 0.5 um and less than or equal to 20 um; and
the first pad micro-wires and first interstitial micro-wires occupy an area less than 15% of the first pad area and first interstitial area.

21. The touch-responsive capacitive apparatus of claim 1, wherein the first or second interstitial micro-pattern has no micro-wire breaks.

22. The touch-responsive capacitive apparatus of claim 1, wherein the first or second interstitial micro-pattern has a shorter micro-pattern path length than the first or second pad micro-wires.

23. The touch-responsive capacitive apparatus of claim 1, wherein first interstitial micro-wires extending across the first interstitial area extend in the first direction and the first pad micro-wires extend in a direction other than the first direction or the second interstitial micro-wires extending across the second interstitial area extend in the second direction and the second pad micro-wires extend in a direction other than the second direction.

24. The touch-responsive capacitive apparatus of claim 1, wherein the first interstitial micro-wires extend straight across the first interstitial area in the first direction or the second interstitial micro-wires extend straight across the second interstitial area in the second direction.

25. The touch-responsive capacitive apparatus of claim 1, wherein the first interstitial micro-wires form a grid or straight lines and the first pad micro-wires form diamonds or the second interstitial micro-wires form a grid or straight lines and the second pad micro-wires form diamonds.

26. The touch-responsive capacitive apparatus of claim 1, wherein the first interstitial micro-wires form an array of straight lines and the first pad micro-wires form a grid or the second interstitial micro-wires form an array of straight lines and the second pad micro-wires form a grid.

* * * * *